(12) United States Patent
Rowland et al.

(10) Patent No.: US 8,384,004 B1
(45) Date of Patent: *Feb. 26, 2013

(54) REAL-TIME MULTI-MODE NEUTRON MULTIPLICITY COUNTER

(75) Inventors: Mark S. Rowland, Alamo, CA (US); Raymond A. Alvarez, Berkeley, CA (US)

(73) Assignee: Lawrence Livermore National Security, Livermore, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 12/692,323

(22) Filed: Jan. 22, 2010

Related U.S. Application Data

(63) Continuation-in-part of application No. 12/047,297, filed on Mar. 12, 2008, now Pat. No. 7,755,015, and a continuation-in-part of application No. 11/257,607, filed on Oct. 24, 2005, now abandoned.

(60) Provisional application No. 60/621,105, filed on Oct. 22, 2004.

(51) Int. Cl.
G01T 3/00 (2006.01)
G06M 11/00 (2006.01)
G21C 17/00 (2006.01)

(52) U.S. Cl. .................. 250/207; 250/390.01; 250/391; 376/154; 376/254; 377/10

(58) Field of Classification Search .................. 250/207, 250/390.01, 390.11, 390.12, 391, 392; 376/254, 376/153, 154, 156, 158, 159; 377/10, 6
See application file for complete search history.

(56) References Cited

U.S. PATENT DOCUMENTS

| | | | | |
|---|---|---|---|---|
| 3,991,611 A | * | 11/1976 | Marshall et al. | 340/855.5 |
| 4,766,543 A | * | 8/1988 | Schmidt | 702/8 |
| 7,383,142 B2 | * | 6/2008 | Scoullar et al. | 702/66 |
| 7,411,198 B1 | * | 8/2008 | Holland et al. | 250/370.01 |
| 7,521,682 B1 | * | 4/2009 | Holland et al. | 250/370.01 |
| 7,583,776 B2 | * | 9/2009 | Newell et al. | 377/6 |
| 7,755,015 B2 | * | 7/2010 | Rowland et al. | 250/207 |
| 7,756,237 B2 | * | 7/2010 | Prasad et al. | 376/159 |
| 8,044,366 B2 | * | 10/2011 | Croft et al. | 250/390.01 |
| 8,155,258 B2 | * | 4/2012 | Rowland et al. | 376/156 |
| 8,180,013 B2 | * | 5/2012 | Prasad et al. | 376/257 |
| 8,194,813 B2 | * | 6/2012 | Prasad et al. | 376/153 |

(Continued)

Primary Examiner — John Lee
(74) Attorney, Agent, or Firm — Dergosits & Noah

(57) ABSTRACT

Embodiments are directed to a digital data acquisition method that collects data regarding nuclear fission at high rates and performs real-time preprocessing of large volumes of data into directly useable forms for use in a system that performs non-destructive assaying of nuclear material and assemblies for mass and multiplication of special nuclear material (SNM). Pulses from a multi-detector array are fed in parallel to individual inputs that are tied to individual bits in a digital word. Data is collected by loading a word at the individual bit level in parallel, to reduce the latency associated with current shift-register systems. The word is read at regular intervals, all bits simultaneously, with no manipulation. The word is passed to a number of storage locations for subsequent processing, thereby removing the front-end problem of pulse pileup. The word is used simultaneously in several internal processing schemes that assemble the data in a number of more directly useable forms. The detector includes a multi-mode counter that executes a number of different count algorithms in parallel to determine different attributes of the count data.

20 Claims, 21 Drawing Sheets

U.S. PATENT DOCUMENTS

| | | | |
|---|---|---|---|
| 8,194,814 B2 * | 6/2012 | Rowland et al. | 376/154 |
| 2002/0163987 A1 * | 11/2002 | Ronaldson et al. | 376/153 |
| 2005/0094758 A1 * | 5/2005 | Ronaldson et al. | 376/153 |
| 2006/0081787 A1 * | 4/2006 | Prasad et al. | 250/391 |
| 2006/0146977 A1 * | 7/2006 | Rowland et al. | 377/10 |
| 2006/0203951 A1 * | 9/2006 | Ronaldson et al. | 376/153 |
| 2006/0284100 A1 * | 12/2006 | Bak | 250/369 |
| 2007/0076848 A1 * | 4/2007 | Walter et al. | 378/98.8 |
| 2007/0230651 A1 * | 10/2007 | Rowland et al. | 376/254 |
| 2008/0205580 A1 * | 8/2008 | Rowland et al. | 377/11 |
| 2009/0114835 A1 * | 5/2009 | Prasad et al. | 250/391 |
| 2010/0215138 A1 * | 8/2010 | Rowland et al. | 376/254 |
| 2010/0332145 A1 * | 12/2010 | Rowland et al. | 702/22 |
| 2012/0116730 A1 * | 5/2012 | Prasad et al. | 703/2 |

* cited by examiner

Neutron Counting Requirements Matrix

|  | Trigger Mode 1 | Trigger Mode 2 |
|---|---|---|
| Measurement Class A | Data Mode 1.A<br>Record neutron multiplicities in various time subgates during each Data Acquisition Cycle (DAC) comprising a single Data Acquisition Gate (DAG), containing 512 primary time bins.<br><br>Mode 1.A.1: Uses "Efficient" subgate array.  Mode 1.A.2: Uses "Inefficient" subgate array. | Data Mode 2.A<br>Record neutron multiplicities in various time subgates during each DAC, which comprises a single DAG (containing 512 primary time bins), which begins after a user selected delay following the trigger.<br><br>Uses "Inefficient" subgate array. |
| Measurement Class B | Data Mode 1.B<br>Record neutron-pair time interval distributions during each DAC, which comprises two successive Data Acquisition Gates (1024 time bins).<br>Uses "Inefficient" interval sorting algorithm.<br>Rossi- Analysis | Data Mode 2.B<br>Record time interval distributions between neutron pairs during each DAC, which comprises a single DAG. The DAG consists of 512 counting bins. Recorded pairs can be limited to a subgate with user-selected length and delay from the trigger<br>Uses "Inefficient" interval sorting algorithm. |
| Measurement Class C | Not Applicable | Data Mode 2.C<br>Record the number of multiplets of each multiplicity ( 256) in each time bin during each DAC comprising a single DAG. The DAG begins after an adjustable delay following the trigger, it consists of 512 time bins.<br>Multiplet Die-Away Analysis |

Bin-Count Tally and Interval Frequency Array for Mode 1.B — Case 1 — "Type-II" analyzer mode.

*Illustrative data sample for a single 1024-bin DAC*

| Bin # | 1 | 2 | 3 | 4 | 5 | 6 | 7 | 8 | 9 | 10 | 11 | 12 | 13 | 14 | 15 | 16 | 17 | 18 | -- | 508 | -- | 512 | 513 | -- | 518 | -- | 1017 | -- | 1024 |
|---|---|---|---|---|---|---|---|---|---|---|---|---|---|---|---|---|---|---|---|---|---|---|---|---|---|---|---|---|---|
| Counts | 0 | 1 | 0 | 1 | 0 | 0 | 1 | 0 | 0 | 0 | 0 | 0 | 0 | 0 | 0 | 0 | 2 | 0 | -- | 1 | -- | 0 | 0 | -- | 2 | -- | 1 | -- | 0 |

*Interval tabulation for the single DAC shown* — Notation: [b2 = bin #2, etc.]

| Interval | | |
|---|---|---|
| b2-b4 | $\delta(2,4)$ = $\tau_0 \cdot (4-2)$ = | $\tau_0 \cdot 2$ |
| b2-b7 | $\delta(2,7)$ = $\tau_0 \cdot (7-2)$ = | $\tau_0 \cdot 5$ |
| b2-b17 | $\delta(2,17)$ = $\tau_0 \cdot (17-2)$ = | $\tau_0 \cdot 15$ |
| b2-b17 | $\delta(2,17)$ = $\tau_0 \cdot (17-2)$ = | $\tau_0 \cdot 15$ |
| b2-b508 | $\delta(2,508)$ = $\tau_0 \cdot (508-2)$ = | $\tau_0 \cdot 506$ |
| b2-b518 | $\delta(2,518)$ = $\tau_0 \cdot (518-2)$ = | $\tau_0 \cdot 516$ |
| b2-b518 | $\delta(2,518)$ = $\tau_0 \cdot (518-2)$ = | $\tau_0 \cdot 516$ |
| b2-b1017 | $\delta(2,1017)$ = $\tau_0 \cdot (1017-2)$ = | $\tau_0 \cdot 1015$ |
| etc. | | |

*Frequency of time intervals between neutron pairs with $0 \le \Delta t \le 1024 \cdot \tau_0$; "inefficient" sorting algorithm.*
*This example considers only a single 1024-bin Data Acquisition Cycle (with counts as illustrated)*

| Time Interval, $\Delta t$: | $0 \cdot \tau_0$ | $1 \cdot \tau_0$ | $2 \cdot \tau_0$ | $3 \cdot \tau_0$ | $4 \cdot \tau_0$ | $5 \cdot \tau_0$ | $6 \cdot \tau_0$ | $7 \cdot \tau_0$ | -- | $15 \cdot \tau_0$ | -- | $506 \cdot \tau_0$ | -- | $516 \cdot \tau_0$ | -- | $1015 \cdot \tau_0$ | -- | $1024 \cdot \tau_0$ |
|---|---|---|---|---|---|---|---|---|---|---|---|---|---|---|---|---|---|---|
| No. of Intervals: | 0 | 0 | 1 | 0 | 0 | 1 | 0 | 0 | -- | 2 | -- | 1 | -- | 2 | -- | 1 | -- | 0 |

Each element in a similar *cumulative* data array is to be incremented, after each data acquisition cycle, for the duration of the measurement.

| Virtual Trigger Bin: | 2 | 3 | 4 | 5 | -- | 1024 |
|---|---|---|---|---|---|---|
| No. of Virtual Triggers: | 1 | 0 | 0 | 0 | -- | 0 |

Each element on a similar *cumulative* data array is to be incremented, after each data acquisition cycle, for the duration of the measurement.

Collect two data vectors.

In the Type-II analysis mode, only one neutron (in the lowest-numbered occupied bin in the dual DAC) is considered the virtual trigger neutron.
If only a single neutron is detected on a DAC, the cumulative Virtual Trigger Bin array is incremented, even there are no valid neutron-pair intervals for that DAC.

| Bin # | 1 | 2 | 3 | 4 | 5 | 6 | 7 | 8 | 9 | 10 | 11 | 12 | 13 | 14 | 15 | 16 | 17 | 18 | ... | (to 512) |
|---|---|---|---|---|---|---|---|---|---|---|---|---|---|---|---|---|---|---|---|---|
| No. of counts in bin (m): | 0 | 1 | 0 | 1 | 0 | 0 | 2 | 0 | 0 | 0 | 1 | 1 | 0 | 0 | 0 | 0 | 1 | 0 | ... | |
| Subgate | $g_1$ | $g_2$ | $g_3$ | $g_4$ | $g_5$ | $g_6$ | $g_7$ | $g_8$ | $g_9$ | $g_{10}$ | $g_{11}$ | $g_{12}$ | $g_{13}$ | $g_{14}$ | $g_{15}$ | $g_{16}$ | $g_{17}$ | $g_{18}$ | ... | (to $g_{512}$) |
| Subgate Width (units of $\tau_o$): | 0 | 1 | 2 | 3 | 4 | 5 | 6 | 7 | 8 | 9 | 10 | 11 | 12 | 13 | 14 | 15 | 16 | 17 | ... | |
| No. of counts in subgate ($\mu$): | 0 | 1 | 1 | 2 | 2 | 2 | 4 | 4 | 4 | 4 | 5 | 6 | 6 | 6 | 6 | 6 | 7 | 7 | ... | |

Example of Data Matrix for Mode 2.A

Multiplicities ($\mu=0 - \mu=\mu_{max}$) occurring in subgates of various width (with counts illustrated):
This example considers only a single Data Acquisition Cycle *on this DAC*.
only the 1st 18 counting bins are considered in the example.

| Subgate Width (units of $\tau_o$): | 1 | 2 | 3 | 4 | 5 | 6 | 7 | 8 | 9 | 10 | 11 | 12 | 13 | 14 | 15 | 16 | 17 | 18 | ... | (to 512) |
|---|---|---|---|---|---|---|---|---|---|---|---|---|---|---|---|---|---|---|---|---|
| Subgate Multiplicity $\mu$ | | | | | | | | | | | | | | | | | | | | |
| "zeros" 0 | 1 | 0 | 0 | 0 | 0 | 0 | 0 | 0 | 0 | 0 | 0 | 0 | 0 | 0 | 0 | 0 | 0 | 0 | : | |
| "singles" 1 | 0 | 1 | 1 | 0 | 0 | 0 | 0 | 0 | 0 | 0 | 0 | 0 | 0 | 0 | 0 | 0 | 0 | 0 | : | |
| "doubles" 2 | 0 | 0 | 0 | 1 | 1 | 1 | 0 | 0 | 0 | 0 | 0 | 0 | 0 | 0 | 0 | 0 | 0 | 0 | : | |
| "triples" 3 | 0 | 0 | 0 | 0 | 0 | 0 | 1 | 1 | 1 | 1 | 0 | 0 | 0 | 0 | 0 | 0 | 0 | 0 | : | |
| 4 | 0 | 0 | 0 | 0 | 0 | 0 | 0 | 0 | 0 | 0 | 1 | 0 | 0 | 0 | 0 | 0 | 0 | 0 | : | |
| *etc.* 5 | 0 | 0 | 0 | 0 | 0 | 0 | 0 | 0 | 0 | 0 | 0 | 1 | 1 | 1 | 1 | 1 | 0 | 0 | : | |
| 6 | 0 | 0 | 0 | 0 | 0 | 0 | 0 | 0 | 0 | 0 | 0 | 0 | 0 | 0 | 0 | 0 | 1 | 0 | : | |
| 7 | 0 | 0 | 0 | 0 | 0 | 0 | 0 | 0 | 0 | 0 | 0 | 0 | 0 | 0 | 0 | 0 | 0 | 1 | : | |
| *etc.* (to $\mu_{max}$) | | | | | | | | | | | | | | | | | | | | |

Each element in *cumulative* data matrix is incremented, after each data acquisition cycle, for the duration of the measurement.

Collect one data array.

REAL-TIME MULTI-MODE NEUTRON MULTIPLICITY COUNTER

CROSS-REFERENCE TO RELATED APPLICATIONS

This application is a continuation-in-part of U.S. application Ser. No. 12/047,297, filed Mar. 12, 2008, which is a Continuation-in-Part of U.S. application Ser. No. 11/257,607, filed Oct. 24, 2005, which claims the benefit of U.S. Provisional Application No. 60/621,105, filed Oct. 22, 2004, each of which are incorporated herein by reference.

STATEMENT REGARDING FEDERALLY SPONSORED RESEARCH

The United States Government has rights in this invention pursuant to Contract No. DE-AC52-07NA27344 between the United States Department of Energy and Lawrence Livermore National Security, LLC.

FIELD

The present invention relates neutron multiplicity counting systems and methods, and more specifically to a multi-mode, real-time neutron multiplicity counter.

BACKGROUND

Neutrons are a fundamental part of any process involving nuclear fission, and thus detection of neutrons is important for radiation protection purposes. Neutron radiation is an ever-present hazard in nuclear reactors. Neutron detectors used for radiation safety must take into account the way damage caused by neutrons varies with energy, and neutron detection techniques may differ depending upon the actual application. Effective neutron detection systems are required to overcome various challenges, such as background noise, high detection rates, neutron neutrality, and low neutron energies. The main components of background noise in neutron detection are high-energy photons (which are not easily shielded), and alpha and beta particles (some of which can be prevented by shielding). Photons are the major source of interference in neutron detection. Unfortunately, both photons and neutrons register similar energies after scattering into a detector from the target, and are thus hard to distinguish from one another. Another challenge is that since the detector typically lies in a region of high beam activity, it is continuously hit by neutrons and background noise at overwhelmingly high rates. This can obfuscate the collected data, since there is extreme overlap in measurement, and separate events are not easily distinguished from each other. It is thus necessary to keep detection rates as low as possible and use a detector that can keep up with high detection rates to yield coherent data.

Neutrons are generated through spontaneous fission, induced fission, or alpha particle induced ($\alpha$,n) reactions. Because neutrons have mass but no electrical charge, they cannot produce ionization in a detector and, therefore, cannot be detected directly. Detecting neutrons requires an interaction of an incident neutron with a nucleus to produce a secondary charged particle that can itself be detected. The presence of emitted neutrons is thus deduced from the presence of neutrons of such secondary charged particles.

The energy distribution of fission (spontaneous or induced) neutrons is very different to that of ($\alpha$,n) neutrons, and can thus be used to help determine the source of neutrons. However, it is generally not possible to use simple energy discrimination to distinguish neutrons from different sources because a measurement consists of both cosmic induced neutrons that cover all energies, as well as those from any unknown source of interest. To improve the analysis process, a characteristic time distribution difference between ($\alpha$,n) neutrons and fission neutrons is analyzed. Fission neutrons typically produce multiple neutrons (e.g., two or three neutrons) simultaneously, whereas ($\alpha$,n) neutrons are produced individually and randomly. Coincidence counting techniques can thus be used to distinguish fission neutrons from random ($\alpha$,n) neutrons.

Neutron detection and counting techniques are used to perform non-destructive assays (NDA) of pure samples of plutonium and uranium. Neutron coincidence counting is used to separate the time-correlated fission neutrons from the random, uncorrelated neutrons to determine the fissile mass of the sample. Multiplicity counting is required to analyze impure samples, such as mixed-oxide scrap. Plutonium in bulk form and in waste generates neutrons from spontaneous fission, ($\alpha$,n) reactions, and induced fission events caused by primary neutrons. Neutron-pair correlation provides the necessary information to determine the spontaneous fission rate and hence the mass of Pu present in a sample, if the isotopic composition is known. The ratio of the ($\alpha$,n) reaction rate to the spontaneous fission neutron emission rate may be calculated. Coincidence counting requires the effective number of neutron singlets and the effective number of neutron doublets to solve for two unknowns. Multiplicity counting involves the counting of correlated triplets also. With the three quantities (singlets, doublets, and triplets), it is possible to determine three unknowns, such as the spontaneous fission rate, the ($\alpha$,n) reaction rate, and the detection probability; or the spontaneous fission rate, detection probability, and the neutron multiplication factor. Higher order multiplicity counting is also possible assuming the data is collected in a way to contain the needed information.

A current standard approach to neutron multiplicity counting is through the use of a shift-register sliding word that is gated and counted repeatedly. This usually gives data for one gate width, which is set to correspond to the neutron lifetime. A shift-register is a single-input device where pulses can pile up and be lost. This data loss presents a significant disadvantage for current shift-register based detection systems. Another approach to multiplicity counting is a list mode data acquisition system in which every pulse event is stored in memory. In this system, every pulse is assigned a time-tagged value and stored as a word. The volume of data that accumulates can be on the order of many gigabytes if the objective is a non-destructive assay. The disadvantage of this type of system is that a large quantity of data is required to minimize statistical errors, thus requiring massive amounts of system memory.

It is therefore desirable to provide a neutron multiplicity counter utilizing multiple gates, with different definitions of the gate and counting approaches, and with a parallel architecture that reduces pulse pile up dead time.

In general, multiplicity counters are readily used in conjunction with various types of neutron detectors, and detection hardware refers to the type of neutron detector used and the electronics used in the detector. For example, the most common present detector type is the scintillation detector. The detector hardware defines key experimental parameters, such as source-detector distance, solid angle and detector shielding. Detection software consists of analysis tools that perform tasks such as graphical analysis to measure the number and energies of neutrons striking the detector.

Detectors that rely on neutron absorption are generally more sensitive to low-energy thermal neutrons, and are orders of magnitude less sensitive to high-energy neutrons. Scintillation detectors, on the other hand, have trouble registering the impacts of low-energy neutrons. Although it is sometimes facilitated by higher incoming neutron energies, neutron detection is generally a difficult task, and improving scintillator design has been an ongoing process in the industry. Original scintillation detectors were improved with the advent of the PMT (photomultiplier tube), which gives a reliable and efficient method of detection since it multiplies the detection signal tenfold. Even so, scintillation design has room for improvement as do other methods of neutron detection, other than scintillation. For example, gaseous ionization detectors can be adapted to detect neutrons. While neutrons do not typically cause ionization, the addition of a nuclide with high neutron cross-section allows the detector to respond to neutrons. Nuclides commonly used for this purpose are boron-10, uranium-235 and helium-3. Further refinements are usually necessary to isolate the neutron signal from the effects of other types of radiation. As elemental boron is not gaseous, neutron detectors containing boron use boron trifluoride ($BF_3$) enriched to 96% boron-10 (natural boron is 20% B-10, 80% B-11).

It is further desirable, therefore, to provide a detection system that effectively detects neutrons by adequately compensating for background noise, high detection rates, neutron neutrality, and low neutron energies. Also desired is a system that preprocesses neutron data into small data files in real time, and reduces processing time required for gigabytes of list mode data.

It is yet further desirable to provide a digital data acquisition unit that collects data (e.g., neutron multiplicity data) at high rate and in real-time preprocesses large volumes of data into directly useable forms.

BRIEF DESCRIPTION OF THE DRAWINGS

Embodiments are illustrated by way of example and not limitation in the figures of the accompanying drawings, in which like references indicate similar elements and in which:

FIG. 3A illustrates a matrix delineating the plurality of modes in which the detector system performs neutron counting operations, under an embodiment.

FIG. 7 shows an example of a count using mode 1.A counting, according to an exemplary embodiment.

FIG. 9 shows an example of a count using mode 1.B counting, according to the exemplary embodiment of FIG. 8.

FIG. 11 shows an example of a count using mode 1.B counting, according to the exemplary embodiment of FIG. 10.

FIG. 13 shows an example of a count using mode 2.A counting, according to an exemplary embodiment.

FIG. 15 shows an example of a count using mode 2.B counting, according to the exemplary embodiment of FIG. 14.

FIG. 17 shows an example of a multiplicity count using mode 2.C counting, according to the exemplary embodiment of FIG. 16

INCORPORATION BY REFERENCE

Figure 1A:
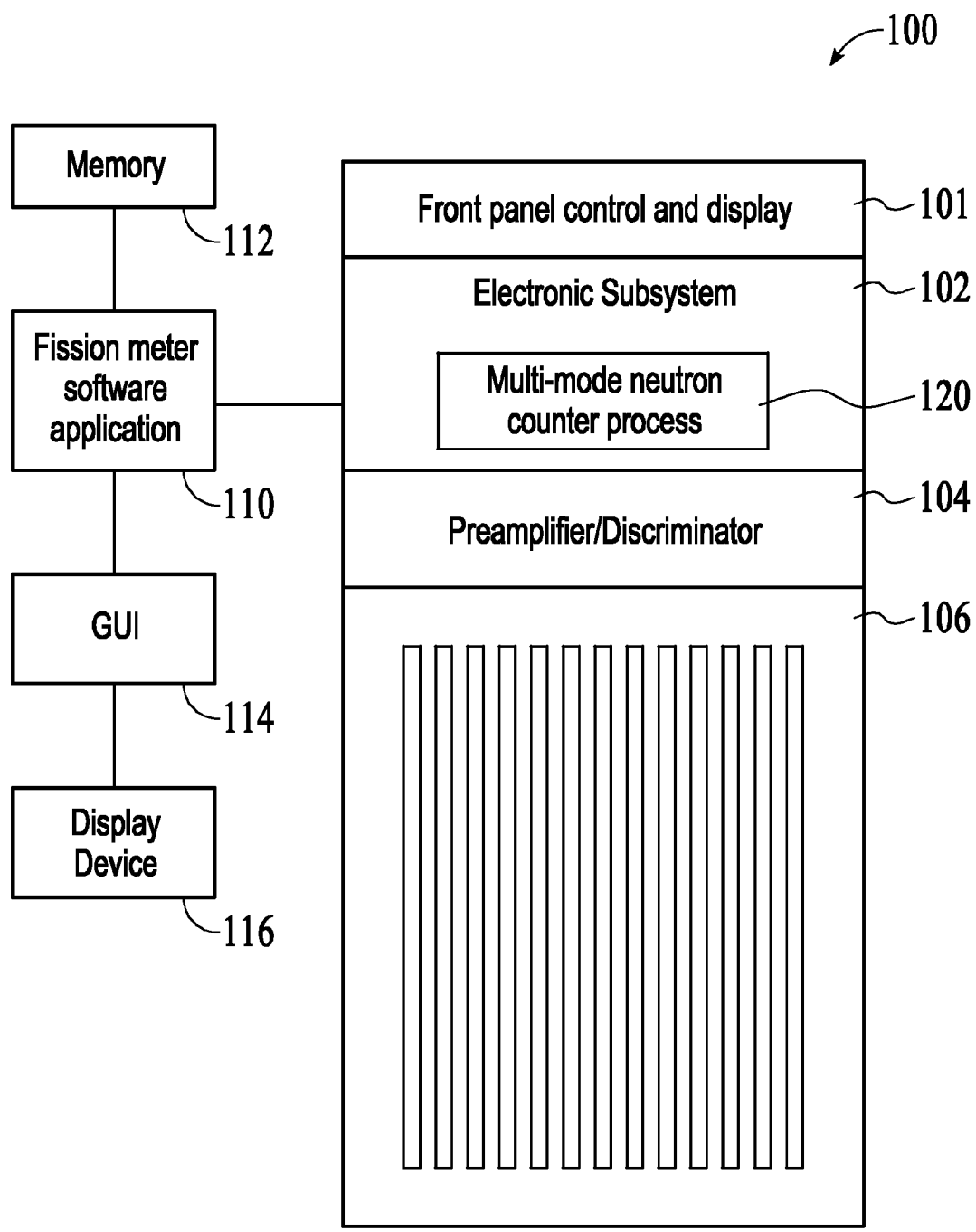
FIG. 1A illustrates a neutron detector system for use with a real-time multiplicity counter, under an embodiment.

Each publication and/or patent mentioned in this specification is herein incorporated by reference in its entirety to the same extent as if each individual publication or patent was specifically and individually indicated to be incorporated by reference.

DETAILED DESCRIPTION OF THE INVENTION

Embodiments are directed to a digital data acquisition method and apparatus that collects data regarding nuclear fission at high rates and performs real-time preprocessing of large volumes of data into directly useable forms. Pulses from a multi-detector array are fed in parallel to individual inputs that are tied to individual bits in a digital word. Data is collected by loading a word at the individual bit level in parallel, so that there is no latency such as in a technique that uses a shift-register. The word is read at regular intervals, with all bits read simultaneously with no manipulation, in order to minimize latency. The electronics then pass the word to a number of storage locations for subsequent processing, thereby removing the front-end problem of pulse pileup. Latency is therefore limited to the latch time in the counter. The word is used simultaneously in several internal processing schemes that assemble the data in a number of more directly useable forms. The technique is useful generally for high-speed processing of digital data, and specifically for non-destructive assaying of nuclear material and assemblies for, typically, mass and multiplication of special nuclear material (SNM).

Under an embodiment, a neutron detector system makes measurements on samples that contain fissile material. The neutron detector system provides identification of fission neutron sources through multiplicity analysis. The system is configured to identify fissionable uranium (U) and plutonium (Pu) by evaluating the distribution in time of neutrons that are emitted spontaneously by these materials. It can be used to perform non-destructive assays of samples and/or segregate threat from non-threat nuclear sources. A fundamental characteristic of uranium or plutonium sources (special nuclear materials, SNM) is that the radioactive decay of each nucleus produces multiple neutrons that are released as the nucleus flies apart after spontaneous fission. Detection of these neutrons can aid or confirm identification of SNM sources, but requires a detector that can distinguish cosmic-ray induced background neutrons.

SNM fission reactions produce a large number of neutrons, thus making them feasible for use as weapons. The number of neutrons associated with a single nuclear fission is a statistical quantity, referred to as "multiplicity". The number of emitted neutrons can be in the range of zero to seven, and is typically on the order of two to four. The simultaneously emitted neutrons are produced by a single decay and occur in a short time window, and are referred to as "correlated" neutrons. Correlated neutrons are indicative of both spontaneous fission and neutron multiplication, both of which are present in a weapon or potentially dangerous sample.

Neutron Detector System

In general, the probability for detecting random neutrons from a sample is constant with time. To determine whether neutron events which are detected are time-correlated, various time periods (measurement gates) are sampled by the coincidence logic for each neutron that is detected. The detector logic identifies those neutron counts that occur within a short time of each other, such as from fission neutrons, closely spaced (α,n) neutrons, and counts due to accidental coincidences. Once one neutron has been detected, the probability of detecting another neutron from the same fission decreases approximately exponentially with time according to the following equation:

$$P(t) = \exp^{(-t/td)}$$

where P(t) is the probability of detecting coincidence neutrons in time t, and Td is the die-away time of the moderated detector assembly.

FIG. 1A illustrates a neutron detector system for use with a real-time multiplicity counter, under an embodiment. In one embodiment, a neutron detector system 100 for implementing a real-time multiplicity neutron counter comprises a plurality of helium (He-3) neutron detectors 106 and associated hardware, including preamplifier/discriminator stage 104 to detect neutron events and generate count data. An electronics sub-system 102 processes the count data from the detectors 106 and preamp stage 104. This sub-system measures the relative time intervals between neutrons arriving at a detection system and builds a statistical distribution of the multiplicity. The electronic coincidence system takes each neutron detected and looks in a number of time interval gates (e.g., up to 512 gates) to record the time interval between each neutron and others in the data stream from the detectors 106. A software application 110 can be used to analyze the output from the electronic subsystem 102 to determine if the source is consistent with a benign neutron source or an SNM source.

The detector system implements a multi-mode counter 120 to monitor how much correlation occurs while sub-sampling each burst of created correlations. The rate that the correlations are created provides an indication of the multiplying system. The counter exploits the way that fission chains are created and provides a way to count the neutrons through a phased observation window. For example, the amount of correlation is observed for a 1 microsecond window, a 2 microsecond window, a 3 microsecond, and so on up to 512 windows. The amount of observable correlations increases as the number of windows are increased up to the point that all correlations are captured. Data related to the created neutrons is stored as a digital word for further processing. In an embodiment, the multi-mode counter 120 has up to five distinct counting modes that vary depending upon trigger condition and measurement parameters. Thus, the various modes of the multi-mode counter have distinctive attributes and provide different ways of counting or observing how and when counts occur, and can be used to fully analyze the correlations that may be present.

In a typical setup of neutron detection unit 100, the incoming particles, comprising neutrons and photons, strike the neutron detector portion. This is typically a scintillation detector stage consisting of scintillating material, a waveguide, and a photomultiplier tube (PMT) that are contained in section 106, and that are connected to a data acquisition (DAQ) system to register detection details. The detection signal from the neutron detector 106 is connected to a scaler unit, gated delay unit, trigger unit and an oscilloscope, all of which may be contained within sections 102 and/or 104 of system 100. The scaler unit is used to count the number of incoming particles or events. It does so by incrementing a tally of particles every time it detects a surge in the detector signal from the zero-point. There is very little dead time in this unit, implying that no matter how fast particles are coming in, it is very unlikely for this unit to fail to count an event (e.g., incoming particle). The low dead time is due to sophisticated electronics in the unit, which take little time to recover from the relatively easy task of registering a logical high every time an event occurs. The trigger unit coordinates all the electronics of the system and gives a logical high to these units when the whole setup is ready to record an event run.

The oscilloscope registers a current pulse with every event. The pulse is merely the ionization current in the detector caused by this event plotted against time. The total energy of the incident particle can be found by integrating this current pulse with respect to time to yield the total charge deposited at the end of the PMT. This integration is carried out in an analog-digital converter (ADC). The total deposited charge is a direct measure of the energy of the ionizing particle (neutron or photon) entering the neutron detector. This signal integration technique is an established method for measuring ionization in the detector in nuclear physics. The ADC has a higher dead time than the oscilloscope, which has limited memory and needs to transfer events quickly to the ADC. Thus, the ADC samples out approximately one in every 30 events from the oscilloscope for analysis. Since the typical event rate is around $10^6$ neutrons every second, this sampling will accumulate thousands of events every second.

The ADC sends its data to a DAQ unit that sorts the data in presentable form for analysis. The key to further analysis lies in the difference between the shape of the photon ionization-current pulse and that of the neutron. The photon pulse is longer at the ends (or "tails") whereas the neutron pulse is well-centered. This fact can be used to identify incoming neutrons and to count the total rate of incoming neutrons. The steps leading to this separation are gated pulse extraction and plotting-the-difference.

Ionization current signals are all pulses with a local peak in between. Using a logical AND gate in continuous time (having a stream of "1" and "0" pulses as one input and the current signal as the other), the tail portion of every current pulse signal is extracted. This gated discrimination method is used on a regular basis on liquid scintillators. The gated delay unit is precisely to this end, and makes a delayed copy of the original signal in such a way that its tail section is seen alongside its main section on the oscilloscope screen. After extracting the tail, the usual current integration is carried out on both the tail section and the complete signal. This yields two ionization values for each event, which are stored in the event table in the DAQ system.

In this step, the extracted ionization values are plotted. Specifically, the graph plots energy deposition in the tail against energy deposition in the entire signal for a range of neutron energies. Typically, for a given energy, there are many events with the same tail-energy value. In this case, plotted points are simply made denser with more overlapping dots on the two-dimensional plot, and can thus be used to estimate the number of events corresponding to each energy-deposition. A considerable random fraction (1/30) of all events is plotted on the graph.

If the tail size extracted is a fixed proportion of the total pulse, then there will be two lines on the plot, having different slopes. The line with the greater slope will correspond to photon events and the line with the lesser slope to neutron events. This is precisely because the photon energy deposition current, plotted against time, leaves a longer "tail" than does the neutron deposition plot, giving the photon tail more proportion of the total energy than neutron tails.

The effectiveness of any detection analysis can be seen by its ability to accurately count and separate the number of neutrons and photons striking the detector. The effectiveness of the second and third steps reveals whether event rates in the experiment are manageable. If clear plots can be obtained in the above steps, allowing for easy neutron-photon separation, the detection can be termed effective and the rates manageable. On the other hand, smudging and indistinguishability of data points will not allow for easy separation of events.

Detection rates can be kept low in many ways. Sampling of events can be used to choose only a few events for analysis. If the rates are so high that one event cannot be distinguished from another, physical experimental parameters (e.g., shielding, detector-target distance, solid-angle, and so on) can be manipulated to give the lowest rates possible and thus distinguishable events. It is important to observe precisely those variables that matter, since there may be false indicators along the way. For example, ionization currents might get periodic high surges, which do not imply high rates but, just high energy depositions for stray events. These surges will be tabulated and viewed with cynicism if unjustifiable, especially if there is very much background noise in the setup.

Every current pulse in the oscilloscope corresponds to exactly one event due to the fact that the pulse lasts about 50 ns, allowing for a maximum of $2 \times 10^7$ events every second. This number is much higher than the actual typical rate, which is usually an order of magnitude less, as mentioned above. This means that is it highly unlikely for there to be two particles generating one current pulse. The current pulses last 50 ns each, and start to register the next event after a gap from the previous event.

Detector system 100 may be embodied within a portable fission meter or neutron source identifier unit that is packaged in an appropriate format for portability and use in the field. The He-3 tube assembly and associated hardware 104 and 102 can be integrated within a single housing or modular configuration with internal (e.g., battery) and/or externally provided power supply. The tube assembly 106 may be provided in a hinged housing made of two or more separate components to facilitate packaging within a portable handheld case. The case enclosing the detector system may be ruggedized for use in different environmental conditions.

In an embodiment, the tube assembly 106 includes thirty 1-inch diameter by 19-inch active length He tubes in association with one or more high density polyethylene (HDPE) moderators, with adjacent pairs of detectors sharing a common preamplifier 104. Depending upon application requirements, other tube arrangements are also possible. The system 100 also includes a front panel control and display unit 101 that includes an LCD display to show neutron counts per second, battery capacity, and cycle count, among other information that may be relevant. Controls can be provided to allow user setting of certain operational parameters, such as on/off, start/stop/clear, and so on.

The detector system 100 may include or be coupled to a processor based computing systems. This computing system serves as a platform for the fission meter software application 110 and includes a microprocessor, memory 112, input/output ports, and an optional graphical user interface (GUI) 114 process for use with an external display device 116. Other possible components may also be provided, such as input means (e.g., keyboard, mouse, trackball, etc . . . ), operating systems, input/output processes, application interfaces, and the like.

The detector may be set to operate in one or more operational configurations, such as mobile search, which is carried out in real-time to locate an SNM source by monitoring total count rate above background (in standard deviations). Another configuration is a static search setting in which the system is put into position and data is collected over a relatively long period (e.g., 15 to 20 minutes). In this configuration, up to 30,000 counts must be obtained from the source, which implies a count time of at least 1000 seconds. A characterization detect configuration can use the determinations of the static search mode to allow the collection of a great deal of data (e.g., up to 1 million counts) for expert analysis off-site.

Figure 18:
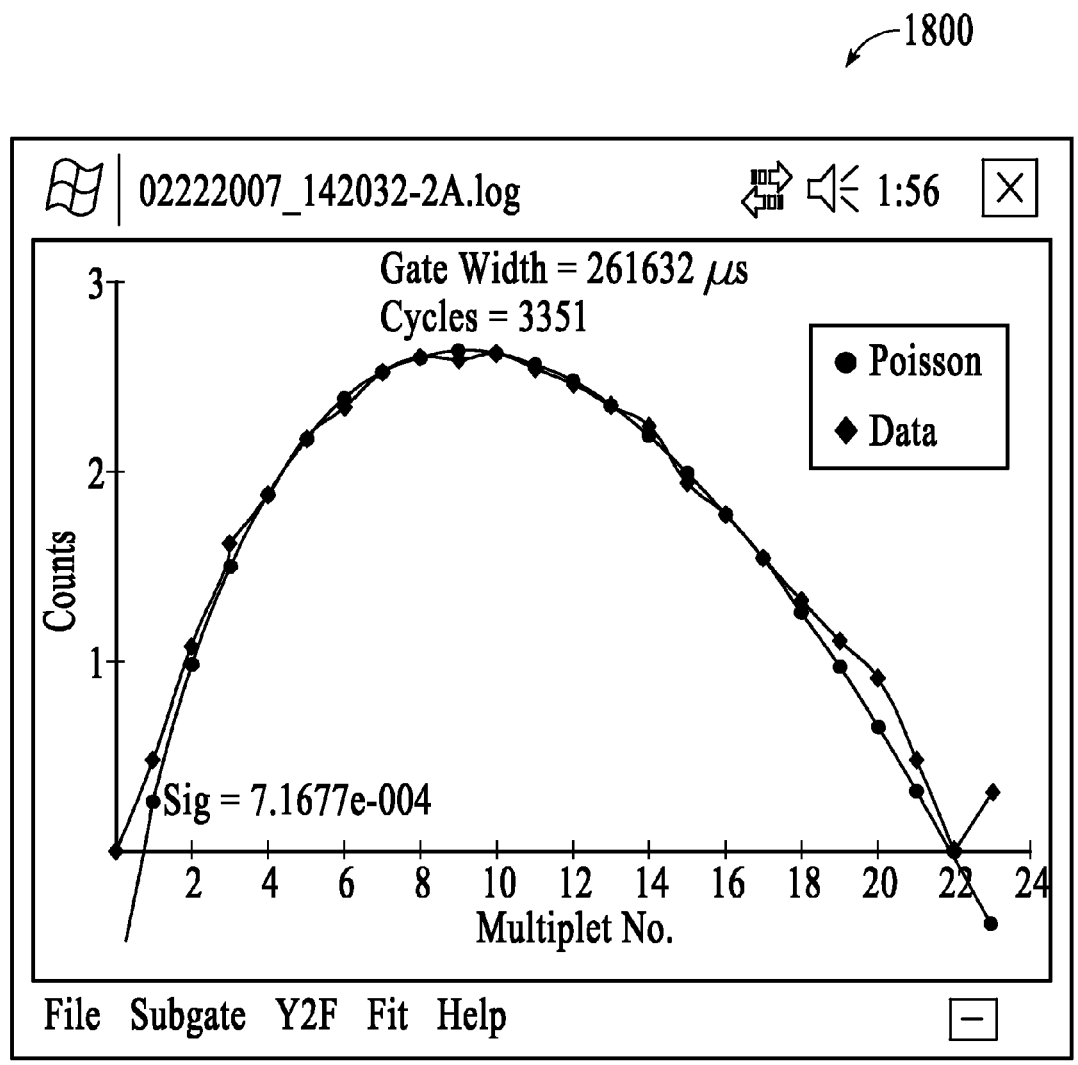
FIG. 18 illustrates an example of a multiplicity plot that can be generated by a detector system, under an embodiment.
Figure 19:
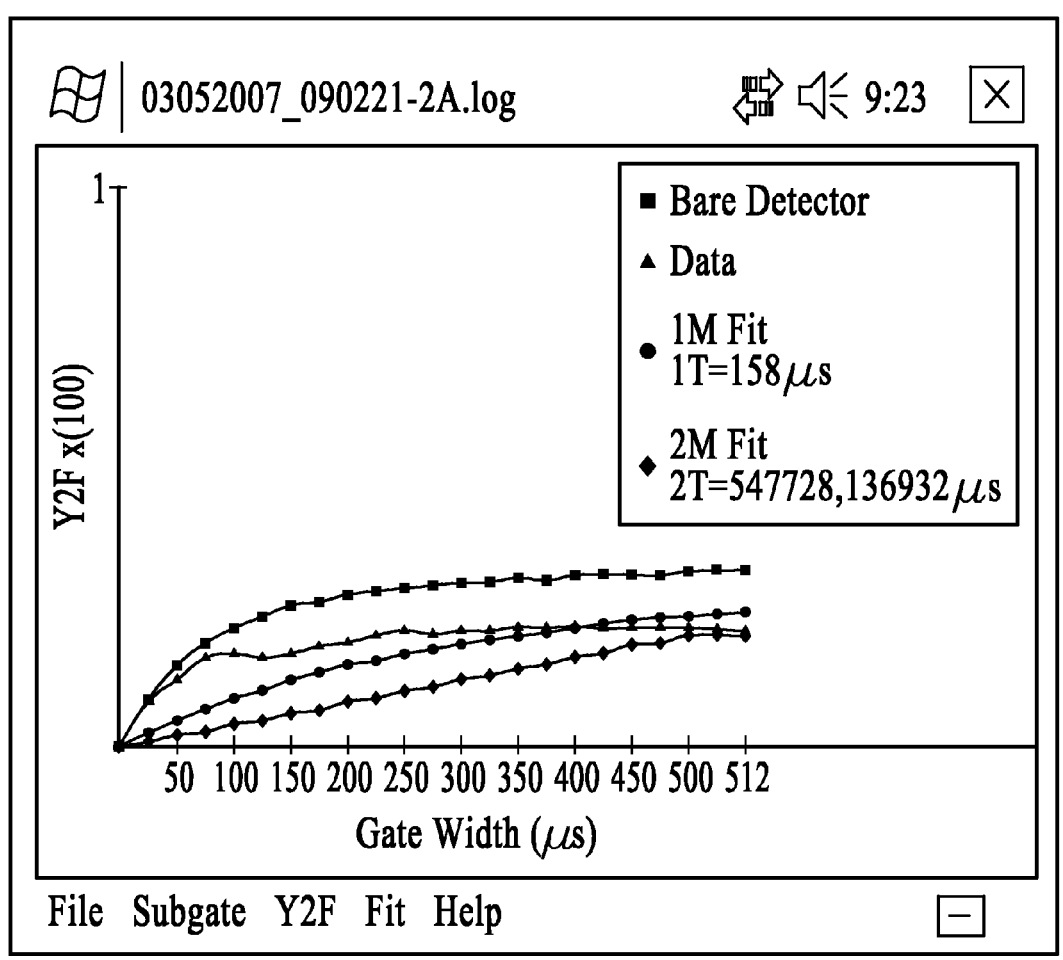
FIG. 19 illustrates an example of a neutron lifetime plot that can be generated by a detector system, under an embodiment.

In general, neutron coincidence counting provides two measured values (reals and totals) while in some cases there are three or more unknown variables which need to be determined, that is, the mass of $^{240}$Pu-effective, $(\alpha,n)$-to-$(SF,n)$ ratio, and multiplication factor. In multiplicity counting, a third measured parameter, the distribution of multiple counts, is derived, and thus the three unknowns may be calculated. The multi-mode counter performs the necessary data collection to generate a histogram of multiplicity events recorded to singles, doubles, and triples event rates. These can be used in conjunction with interpretational models to extract the unknown variables for product material $m_{eff}$, $\alpha$ and $M_L$. The output of the system may be provided in graphical form. For this embodiment, the detector system also includes a graphical generation and output process that displays the plots of various characteristics on a display device 116. FIG. 18 illustrates an example of a multiplicity (fission meter) plot that can be generated by detector system 100, under an embodiment, and FIG. 19 illustrates an example of a neutron lifetime plot that can be generated by detector system 100, under an embodiment. The multiplicity plot 1800 of FIG. 18 shows a random (Poisson) distribution, matched in mean count to the data. It is the deviation of the data which may include non-cosmic effects from a random distribution. The neutron lifetime plot 1900 of FIG. 19 can help the detection of moderation material (e.g., polyethylene shielding).

As shown in FIG. 1, the neutron detector system 100 includes a multi-mode neutron counter process 120 as part of the electronic subsystem 102. The multi-mode neutron counter 120 is a highly parallelized circuit that loads the inputs from the detector system 106 in parallel, performs the count operation and creates sums, which are then written to memory. The parallel architecture allows for fast read and clear processes compared to present counters that use shift registers. A shift-register based system typically combines a number of detector input channels, such as 4, 8, or 16 inputs into a single shift register, which then counts neutrons in real-time, and stores the data as words for each measurement time interval. This type of system suffers from pulse pile-up and creates an excessively large amount of data (e.g., on the order of hundreds of gigabytes), and also introduces errors due to dead time, and other latencies.

Figure 1B:
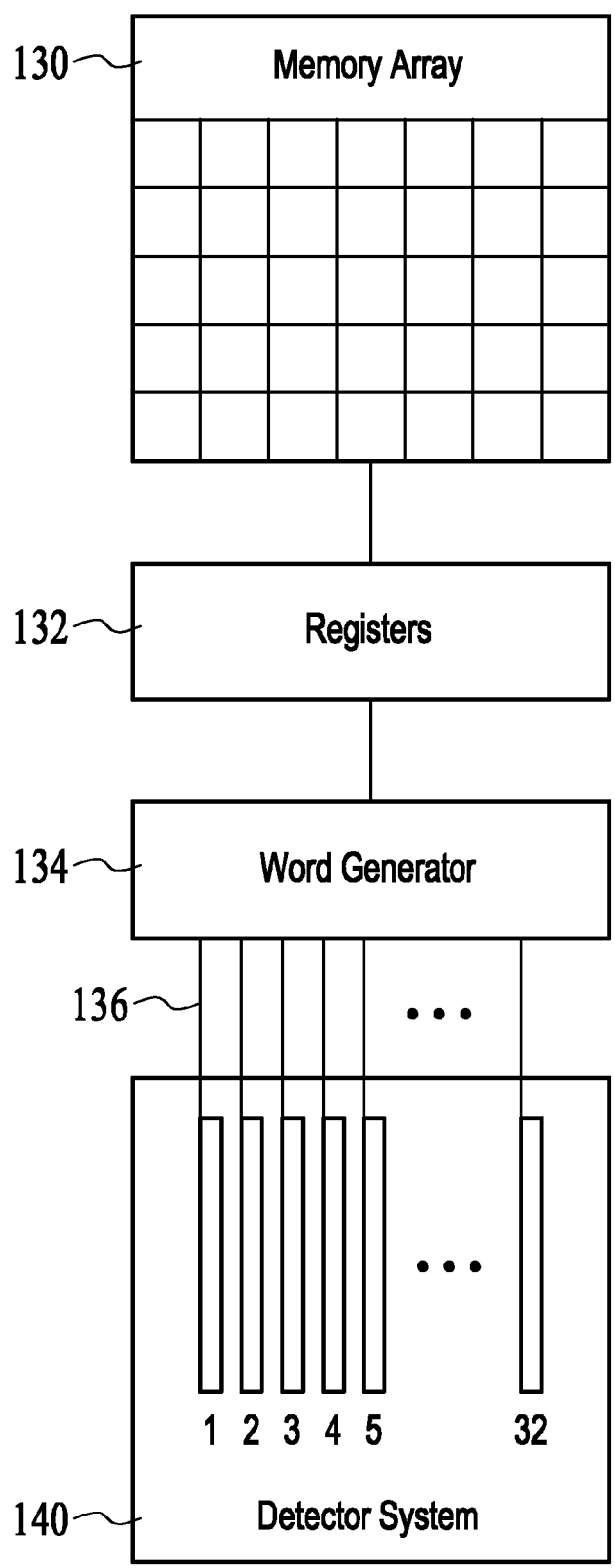
FIG. 1B is a block diagram illustrating the components of a multi-mode neutron counter, under an embodiment.

FIG. 1B is a block diagram illustrating the components of a multi-mode neutron counter, under an embodiment. The detector system 140 includes a plurality of He-3 tubes, numbered 1 to n, where n is typically 32, but can be any number depending upon system configuration. Each detector provides a separate input to a word generator circuit 134. This parallel architecture provides a much finer division of the input stream than present shift-register systems. The input data is used to produce sum data form each clock cycle, which are stored as a digital word in one or more registers 132. The sum data is then stored in a specific address location of a memory 130, which may be partitioned in a matrix arrangement, as shown in FIG. 1B.

For the circuit of FIG. 1B, pulses from a multi-detector array 140 are fed in parallel to individual inputs that are tied to individual bits in a digital word through word generator 134. Data is collected by loading a word at the individual bit level in parallel, so that there is no latency such as in a technique that uses a shift register. The word is read at regular intervals, all bits simultaneously, with no manipulation, to minimize latency. The electronics then pass the word to a number of storage locations in memory 130 for subsequent processing. This scheme removes the front-end problem of pulse pileup and any latency is limited to the latch time in the counter. The word is used simultaneously in several internal processing schemes that assemble the data in a number of more directly useable forms.

Figure 2:
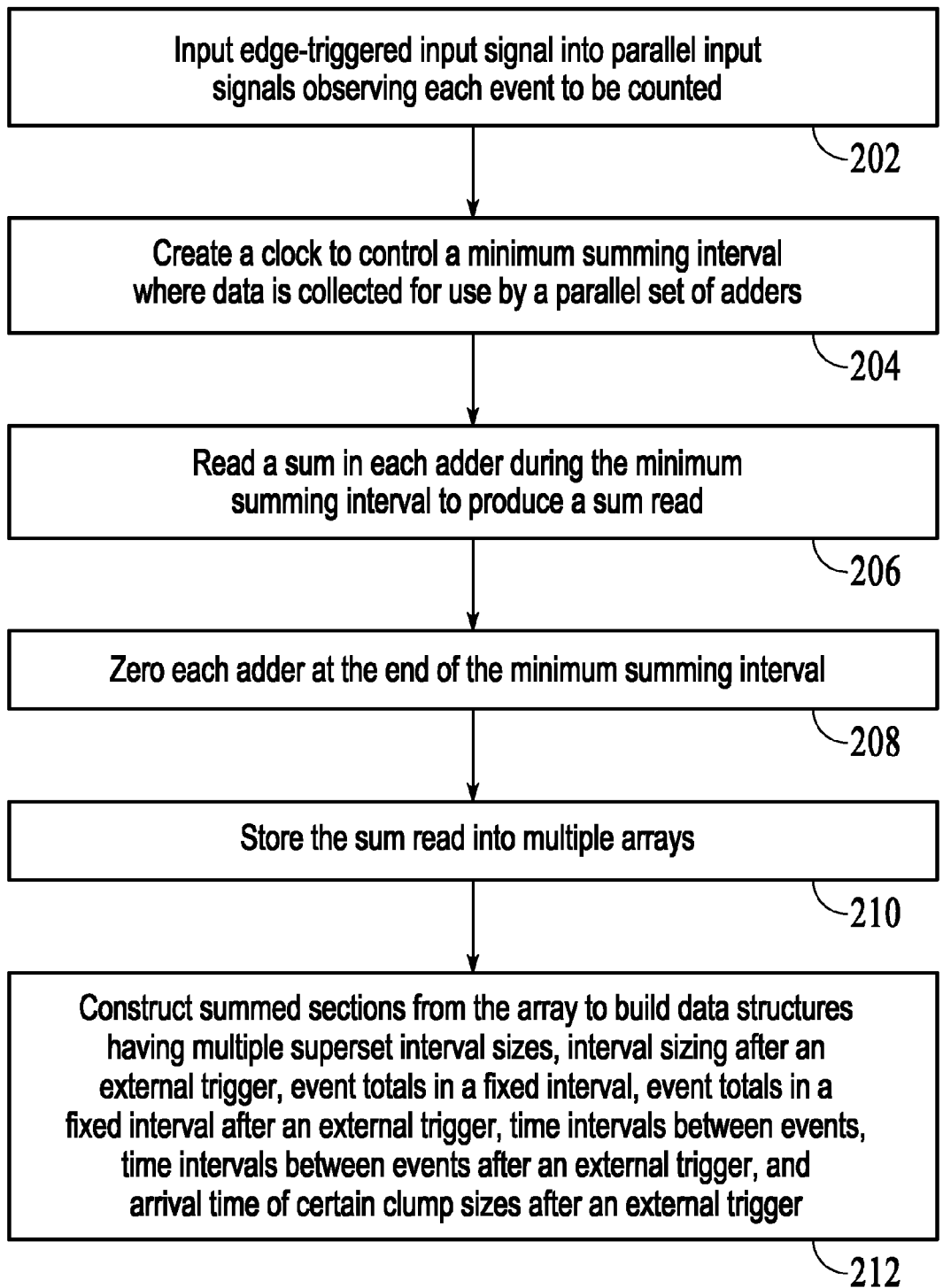
FIG. 2 is a flow chart illustrating a method of event counting using a multi-mode neutron counter, under an embodiment.

FIG. 2 is a flow chart illustrating a method of event counting using a multi-mode neutron counter, under an embodiment. The method includes an act of inputting edge triggered input signals into parallel input circuits observing each event to be counted, act 202. In act 204, the system creates a clock to control a minimum summing interval wherein neutron count data is collected (counted). The clock signal is used by a parallel set of adders, wherein each input circuit is operatively connected to multiple private (independent) adders of the parallel set. In act 206, a sum in each adder is read during the minimum summing interval to produce a sum read. Each adder is then zeroed at the end of the minimum summing interval, act 208. The sum is then read into multiple arrays, act 210. In act 212, the system constructs summed sections from the array to build data structures comprising several characteristics. These characteristics include multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

In a second embodiment of the method of FIG. 2, the method comprises: providing the input signals into parallel input circuits observing each event to be counted; controlling a minimum summing interval in which data is counted for use by a parallel set of adders; producing a sum read; zeroing adder; storing the sum read; and building data structures. In this second method, the input signals may be edge triggered. The minimum summing interval is controlled with a clock. Each input circuit is operatively connected to multiple independent adders of the parallel set. The sum read is produced by reading a sum in each adder during the minimum summing interval. The adders are zeroed at the end of a minimum summing interval. The sum read may be stored into multiple arrays. The data structures are built by constructing summed sections from the array and may comprise data selected from the group consisting of multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger. The data structures may comprise multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

An apparatus for event counting according to an embodiment may be embodied within one or more hardware circuits that implement the process steps of FIG. 2, and may comprise: means for inputting input signals into parallel input circuits observing each event to be counted; means for controlling a minimum summing interval in which data is counted for use by a parallel set of means for adding; means for producing a sum read; means for zeroing each said means for adding; means for storing said sum read; and means for building data structures.

Multi-Mode Implementation

The multi-mode counter module 102 and multi-tube detector 106 allow for a multiply pipelined system that allows for massive parallel inputs to separate inputs of a gate array circuit and the independent tallying of data. The parallel architecture reduces deadtime with, no pulse pileup or latency, since all inputs are accepted. The multi-mode counter 120 analyzes different attributes of the count data. The gate array comprising the counter operates off of a single clock so that all data is on the same clock cycle. The real-time parallel processing creates a record of absolute time when the pulses came in. A pre-processor conditions the data to reduce file size as compared to standard time-tagging systems. For example, file sizes on the order or ½ megabyte are realizable as compared to the multi-gigabyte files of current systems.

The detector system counts single neutrons with reference to a background threshold to enable the location of neutron sources. In one embodiment, the neutron detector comprises a multi-mode neutron counter circuit or process 120 that is used in conjunction with, or is incorporated within the detector. In general, the neutron counter measures for a defined gate width, such as 1 µs after a fission chain starts. The counter then counts for number of gates or measurement windows. The gates can be sequential such that each subsequent gate (measurement window) immediately follows the previous gate. Alternatively, gates can overlap so that some of the count data is re-used. The counter thus generates a time history of when neutrons arrive by opening measurement windows to observe when correlations occur.

In an embodiment, the multi-mode neutron counter accommodates up to five different counting modes depending on different trigger conditions and measurement classes. The counter gathers the neutron data and analyzes for coincidences; singles, doublets, triplets and quads up to a very high order. Neutron multiplicities in various time subgates during each Data Acquisition Cycle (DAC) are recorded. The acquisition cycle may be defined as 512 time bins. In an embodiment, the recorded data is analyzed by the system software, according to the Feynman Variance technique. Multiplicity counting, thus counts separately the number of neutrons detected with a time gate (e.g., none, 1, 2, 3, . . . ), in contrast to neutron coincidence counting, which only looks for pairs of neutrons with a window, and gross counting, which counts all emitted neutrons.

FIG. 3A illustrates a matrix delineating the plurality of modes in which the detector system performs neutron counting operations, under an embodiment. As shown in the neutron counting requirements matrix of FIG. 3A, the system operates in two different trigger modes and performs up to three different classes of measurements per trigger mode. Trigger mode 1 comprises Data Acquisition Cycles (DAC) initiated by periodic internal triggers, and is normally used for passive measurement of naturally radioactive samples; and trigger mode 2 comprises DACs initiated by internal or external periodic triggers and can be used for passive measurements or measurements with periodic neutron generators.

The three measurement classes for each trigger mode are denoted class A, class B, and class C. The class A measurement records neutron multiplicities using Feynman Variance analysis techniques. The Feynman variance technique consists of detecting the neutron count deviations in the time domain of the counting data from what are expected to be random events. For a random source, the ratio of the variance to the mean is equal to one, and for a multiplying source, the ratio is greater than one. The class B measurement records neutron-pair time intervals by measuring the time space between counts. The class C measurement is a time dependence measurement that measures the intensity of the count occurrence through a multiplet die-away analysis. The die-away time is the characteristic time a neutron will survive before it is absorbed in the He-3 detector tubes or escapes the counter. The neutron die-away time normally ranges from 10 to 128 μs depending upon the counter geometry.

Details of the operation and characteristic of each mode within the matrix of FIG. 3A are provided in greater detail in the description below. The modes are denoted 1.A and 1.B (or 1A and 1B) for trigger mode 1, and 2A, 2.B, and 2.C (or 2A, 2B, and 2C) for trigger mode 2.

The multi-mode counter simultaneously collects different items of data pertaining to neutron creation, thus allowing for the observation of the physical nuances of a neutron source. This data includes: neutron lifetime information through the use of multiple time gates, energy effects through the use of a number of gates to capture neutron mode effects, multiplicity in sums that best relate to multiplication (modes 1A and 2A), timing intervals that best relate to the count rate detected (mode 1B versus 2A), and the time structure of time-varying sources (modes 2B and 2C triggered). Modes 1A and 2A are most efficient for observing multiplication (i.e., fission meter plot) mode effects (neutron energy effects). Modes 1B and 2B are suitable for low count rate situations where the time between sparse counts best illustrates correlations. Modes 2B and 2C are suitable for cases where an external event, such as a pulsed neutron source, defines the best time to collect counts Mode 2C is optimized for cases where the particular multiplet structure of a stream of counts needs to be observed over time, which is similar to the idea of an oscilloscope for correlated events.

The parallel gate counting architecture is well suited to capture any number of counting sums that would group selected information, including simply recording the arrival times of every count, because the data streams are multiply pipelined. In an embodiment, all five modes of the multi-mode counter 120 run simultaneously in parallel and independently of one another. This provides many different ways of counting or observing how and when counts (from neutrons or gammas) occur, and analyze the correlations that may be present. An operator or data analyzer can decide which individual count mode or combination of count modes to look at.

The multi-mode counter opens up a gate, which is an observation window randomly in time, and looks at the counts for a number of gate periods. The trigger conditions can be internal or external, and can start with an actual count or a random time tick. In this manner, different triggers and counting parameters can be used to generate count data that provides comprehensive insight into the nature of the correlations present in the neutrons detected by the detector system.

Figure 3B:
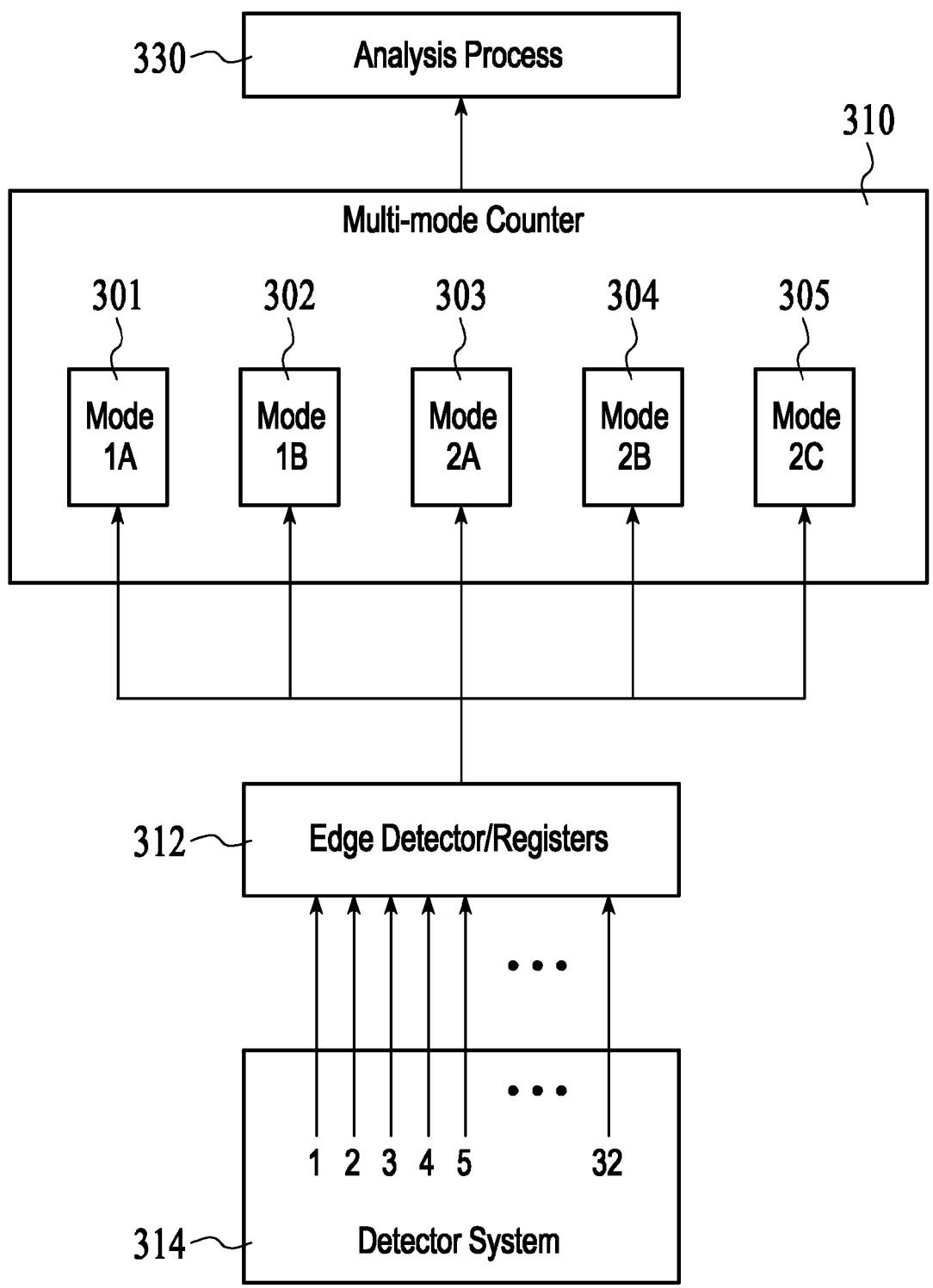
FIG. 3B is a functional block diagram of the multi-mode illustrating the parallelism of the different modes, under an embodiment.

The parallel execution of the subroutines for the different count modes of the multi-mode counter increases the parallelism of the detection system 100. In effect this creates parallel pipeline for all of the inputs of the detector stage. FIG. 3B is a functional block diagram of the multi-mode illustrating the parallelism of the different modes, under an embodiment. As shown in FIG. 3B, the n (e.g., 1-32) inputs from the detector are input to an edge detector/register stage 312. Each detector tube of the detector unit 314 produces an input to the edge detector. This may be a gate-array based edge-triggered sample detector is producing with n inputs pins. As described with reference to FIG. 1B, the detector inputs can generate a word which is produced by either the edge detector at front of the gate array or a register stage after the edge detector, depending on the counting mode. The output from the edge detector 312 is divided out and input individually into each subroutine module of the multi-mode counter 310. For the embodiment of FIG. 3B, the multi-mode counter 310 contains five different subroutines 301-305 for the modes 1A, 1B, 2A, 2B, and 2C illustrated in FIG. 3A. Other modes are also possible. The multiple subroutines execute simultaneously and each subroutine 301-305 processes the stream of pulses as they come in from the detector stages 314 and 312. The results then individually summed as they come in and each subroutine processes each input to produce count data that is conditioned for a particular mode 1A, 1B, 2A, 2B, or 2C. This mode data can then be provided to an analysis process 330 that processes the count data to determine the presence or absence of correlations or other characteristics of the count data.

For the neutron counting requirements matrix of FIG. 3A, the two trigger modes (trigger mode 1 and trigger mode 2) may actually be described as three modes: self-triggered mode 1, self-triggered mode 2 and externally-triggered mode 2. The self-triggered mode 2 counting is essentially an internally triggered mode, like trigger mode 1. The externally-triggered mode is typically called the neutron generator triggered counting.

Figure 4:
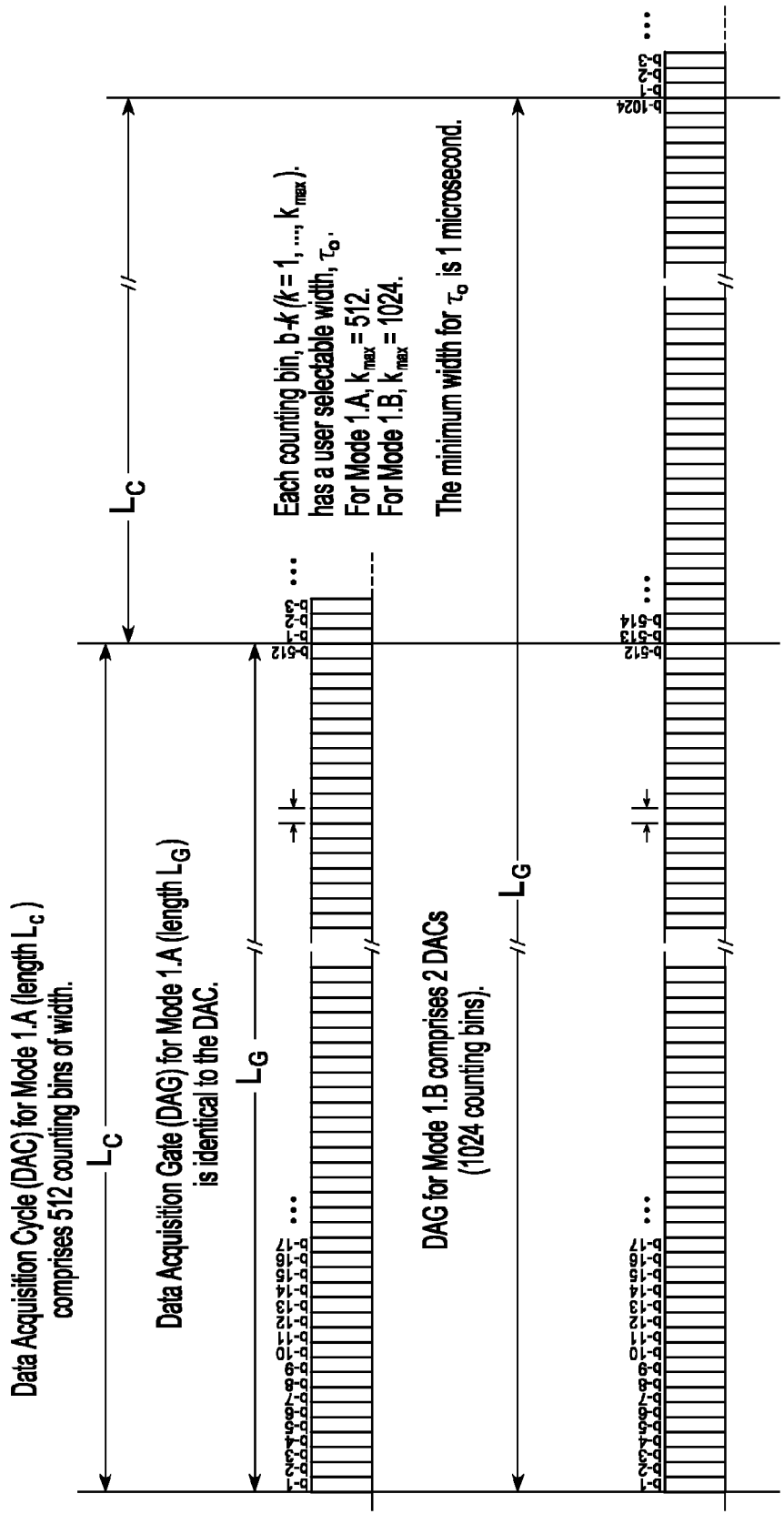
FIG. 4 illustrates Data Acquisition Gate (DAG) and Data Acquisition Cycle (DAC) characteristics for trigger mode 1, under an embodiment.

Trigger mode 1 is typically used for making measurements of neutrons generated by the natural radioactivity of the sample material. In this mode the detector system will employ internally generated, periodic triggers to detect neutrons in data acquisition gates (DAGs). In this mode, the DAGs are uncorrelated with the neutron emission times. FIG. 4 illustrates Data Acquisition Gate (DAG) and Data Acquisition Cycle (DAC) characteristics for trigger mode 1, under an embodiment. As shown in FIG. 2, a DAC for data mode 1.A (trigger mode 1, class A) comprises 512 counting bins of a defined width. The bins are denoted b-1 to b-512 and are of a user selectable width $\tau_0$, where the minimum width for $\tau_0$ is 1 microsecond. The length of the DAG is identical to that of the DAC ($L_G = L_C$) for mode 1.A. In mode 1.A the gates are overlapped to provide a correlated count history which reuses a large amount of the count data, resulting in a relatively smooth data distribution. For mode 1.B, in which neutron-pair time intervals are measured, the DAG comprises two DACs for a total of 1024 counting bins during a data acquisition gate ($L_G=2L_C$).

Figure 5:
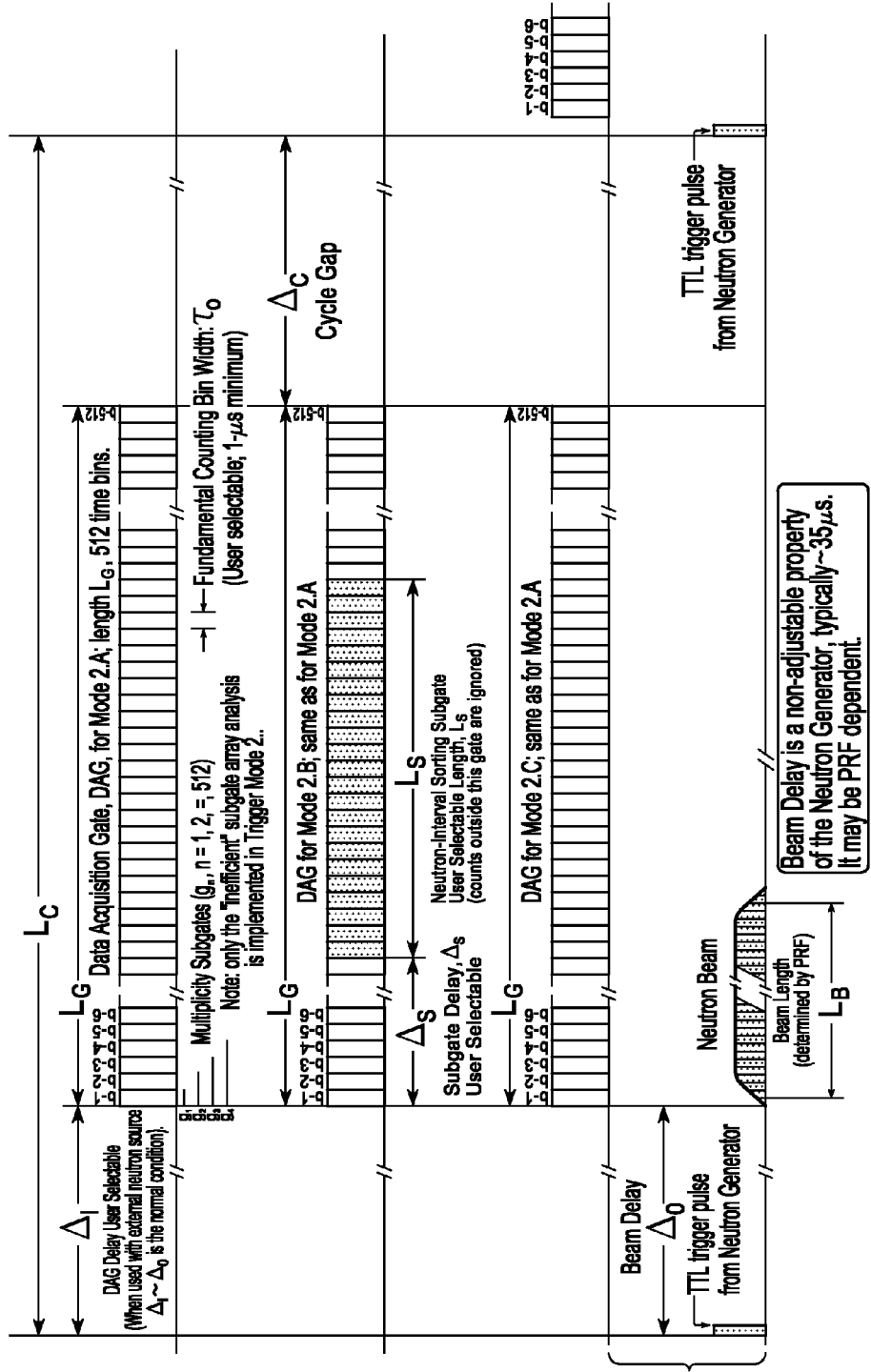
FIG. 5 illustrates Data Acquisition Gate (DAG) and Data Acquisition Cycle (DAC) characteristics for trigger mode 2, including the time correlation of the DAGs and the induced-fission neutrons emitted by the sample, under an embodiment.

Trigger mode 2 is used for measurements of samples with very low natural neutron activity; it may also be useful for measurements on some samples with higher natural activity. Most of the neutrons detected in this mode will be generated by interactions (mainly induced fission) initiated by pulses of 14-MeV neutrons injected into the sample material by an ion-tube (D,T) neutron generator. The periodic triggers for the detector in this mode are provided by the neutron generator at a fixed time relative to the 14-MeV neutron pulses. The DAGs and the induced-fission neutrons emitted by the sample are thus highly correlated in time. FIG. 5 illustrates Data Acquisition Gate (DAG) and Data Acquisition Cycle (DAC) characteristics for trigger mode 2, including the time correlation of the DAGs and the induced-fission neutrons emitted by the sample, under an embodiment. For trigger mode 2, the length of the DAC, $L_c$, is determined by the PRF of the internal or external trigger. The DAG count starts after a delay, $\Delta$, that is user selectable. A number of DAG cycles may be performed each having a number of subgates (1-512) of width $\tau_0$, where the minimum width for $\tau_0$ is 1 microsecond. The initial delay $\Delta_i$, may be the same or different than the delay $\Delta_c$, between the DAG cycles. There may also be a subgate delay $\Delta_s$, associated with one or more measurement classes, as well as a beam delay $\Delta_o$, that is associated with the TTL (transistor-transistor-logic) trigger pulse from the neutron generator.

In both mode 1 and mode 2, two classes of measurements (Class A and Class B) are required, and a third class (Class C) can provide valuable information in mode 2, but is not applicable to mode 1. For each class of measurement the neutrons detected within the DAGs must be sorted in different ways. In order to minimize overall data collection time, it is necessary to carry out the various classes of measurements (i.e., implement the different data sorting algorithms) simultaneously. It should be noted that there may be cases in mode 2 in which different beam delays are required for different measurement classes, which would require separate measurements.

With reference to FIG. 3A, the class A measurement data will be sorted to record statistics on neutron multiplicities detected within temporal sub-gates with different widths. A Feynman Variance type of analysis can be carried out with this data. Although the same data sorting algorithm (the "Inefficient Implementation") can be used for both mode 1 and mode 2 measurements, other sorting algorithms ("efficient implementation") can greatly improve data collection efficiency in mode 1.

Figure 6:
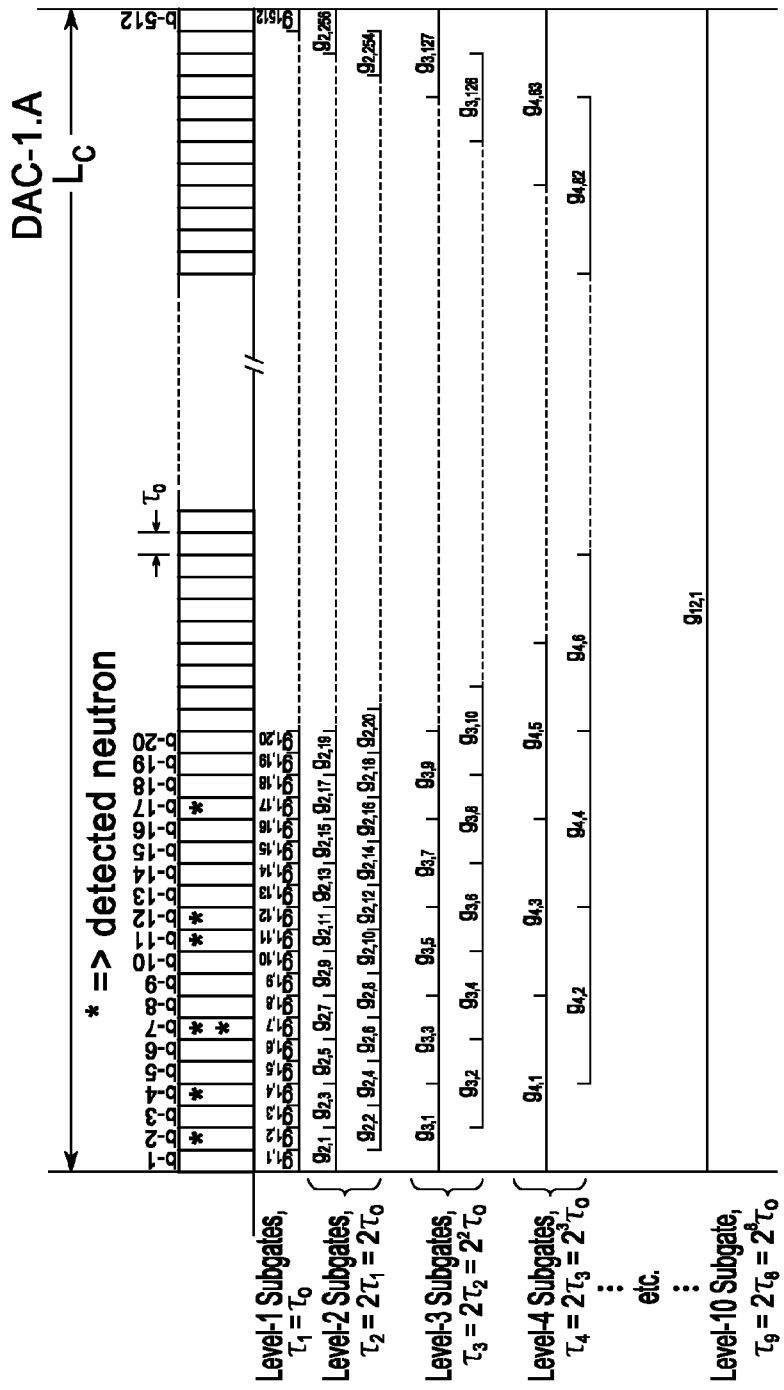
FIG. 6 illustrates a data acquisition cycle for count performed using mode 1.A and showing the subgate detail, under an embodiment.

FIG. 6 illustrates a data acquisition cycle for count performed using mode 1.A and showing the subgate detail, under an embodiment. FIG. 6 shows a data acquisition cycle (DAC) comprising 512 subgates. Mode 1.A utilizes an overlap scheme in which different levels of subgates (denoted $g_{i,j}$) are defined so that data from each bin is used in more than one subgate. This reuse of the data helps smooth the data distribution. The subgate levels are denoted level-1 to level-n, where n can be any appropriate number depending upon system requirements and constraints. As shown in FIG. 6, each level-1 subgate contains the total counts in one bin (b-n), and there are 512 subgates, where $\tau_1=\tau_0$; each level-2 subgate contains the total counts in two adjacent bins, and there are 511 subgates, where $\tau_2=2\tau_1=2\tau_0$; each level-3 subgate contains the total counts in four adjacent bins, and there are 127 subgates, where $\tau_3=2\tau_2=2^2\tau_0$; each level-4 subgate contains the total counts in eight adjacent bins, and there are 63 subgates, where $\tau_4=2\tau_3=2^3\tau_0$; and so on up to the single level-12 subgate that contains the total counts in all 512 counting bins.

Figure 7:
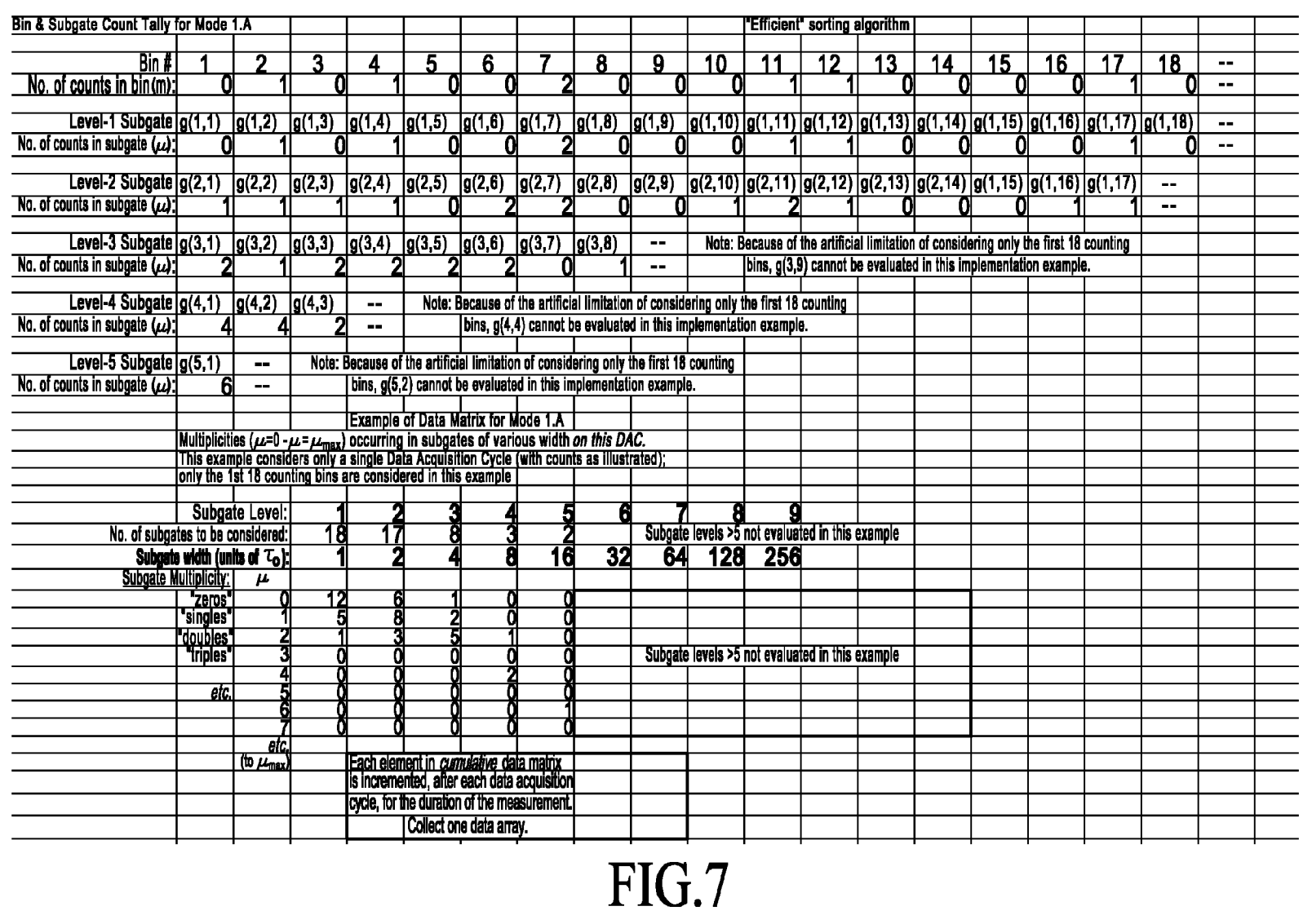

FIG. 7 shows an example of a count using mode 1.A counting, according to an exemplary embodiment. For the example of FIG. 7, the bin and subgate tally for mode 1.A is shown for bins 1-18, and show the multiplicities occurring within subgates of various widths for a particular DAC. The resulting matrix provides example counts of zeros, single, doubles, and triples for the DAC. Each element in the cumulative data matrix is incremented after each DAC for the duration of the measurement.

Figure 12:
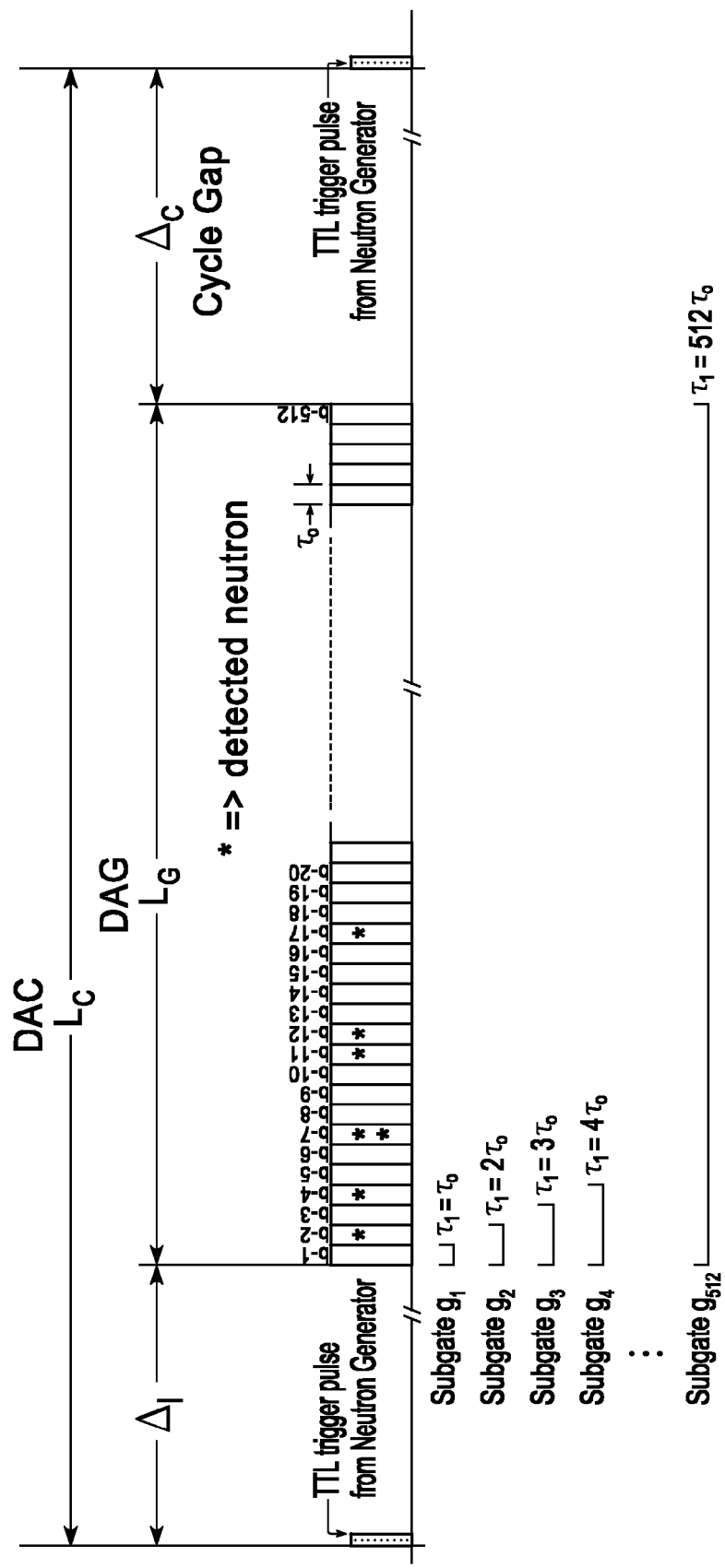
FIG. 12 illustrates a data acquisition cycle for count performed using mode 2.A and showing the subgate detail, under an embodiment.

FIG. 12 illustrates a data acquisition cycle for count performed using mode 2.A and showing the subgate detail, under an embodiment. FIG. 12 shows a data acquisition cycle (DAC) comprising 512 subgates. Mode 2.A utilizes a partial overlap scheme in which different subgate intervals (denoted $g_i$) are defined so that data from each bin may be used in more than one subgate. This reuse of the data helps smooth the data distribution. In certain cases, mode 2.A may be implemented so that the subgates are sequential, in which case no count data is reused. As shown in FIG. 12, subgate $g_1$ consists of a single bin, where $\tau_1=\tau_0$; subgate $g_2$ consists of two adjacent bins, so that $\tau_1=2\tau_0$; subgate $g_3$ consists of three adjacent bins, so that $\tau_1=3\tau_0$; subgate $g_4$ consists of four adjacent bins, so that $\tau_1=4\tau_0$; and so on up to subgate $g_{512}$, which consists of all 512 bins, so that $\tau_1=512\tau_0$. In mode 2, the DACs are initiated by an external trigger. As shown in FIG. 12, an initial delay, $\Delta_i$, precedes the first DAG, and each subsequent DAG is preceded by a cycle gap, $\Delta_c$. The entire DAC is measured from the beginning of the delay preceding the DAG to the end of the delay preceding the next subsequent DAG.

FIG. 13 shows an example of a count using mode 2.A counting, according to an exemplary embodiment. For the example of FIG. 13, the bin and subgate tally for mode 2.A is shown for bins 1-18, and show the multiplicities occurring within subgates of various widths for a particular DAC. The resulting matrix provides example counts of zeros, single, doubles, and triples for the DAC. Each element in the cumulative data matrix is incremented after each DAC for the duration of the measurement.

For measurement class B, the measurement data is sorted to record statistics on the time intervals between successive neutrons detected within the DAGs. A Rossi-Alpha type of analysis can be carried out with this data. In general, the same data sorting algorithm applies for both mode 1 and mode 2.

Figure 8:
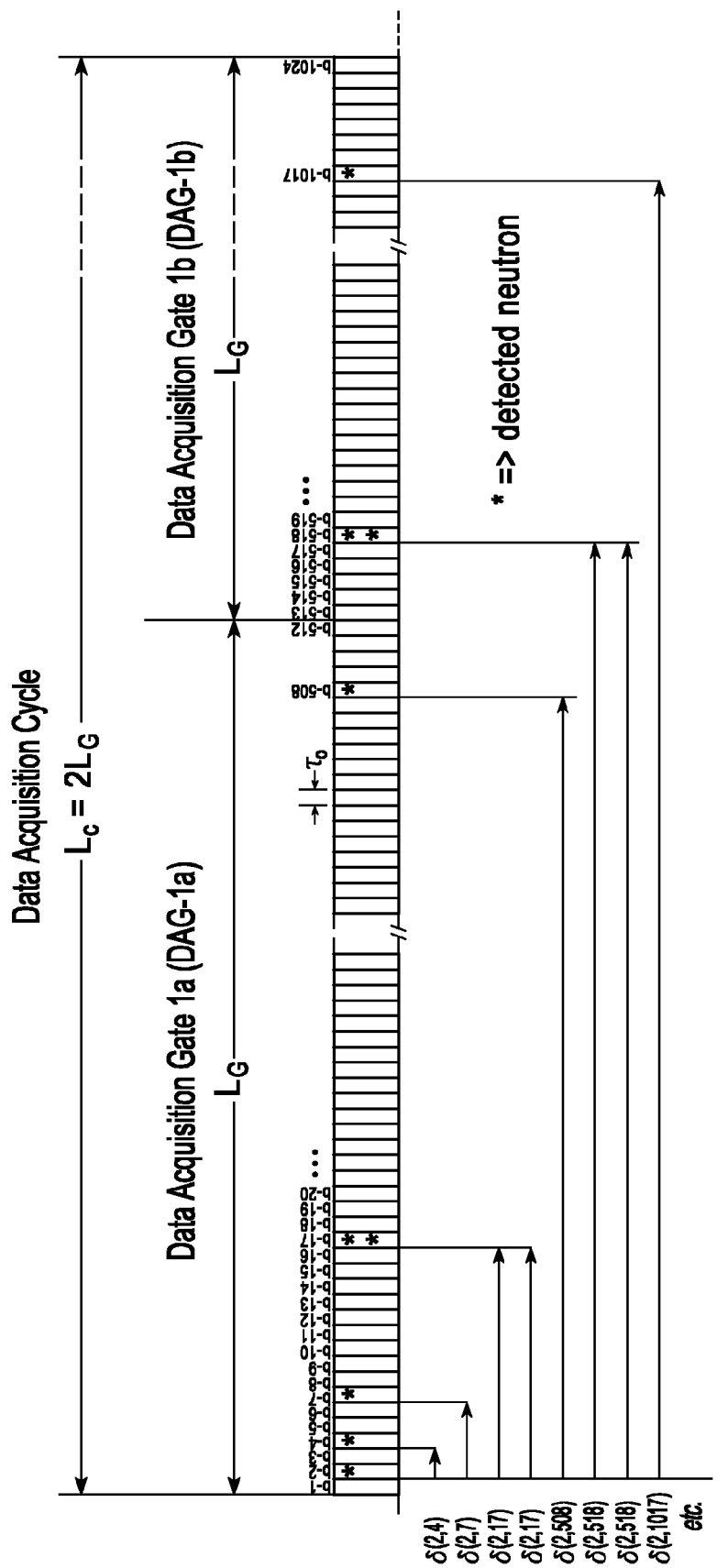
FIG. 8 illustrates a data acquisition cycle for count performed using mode 1.B and showing example interval measurements for two counts in the first bin, under an embodiment.

FIG. 8 illustrates a data acquisition cycle for count performed using mode 1.B and showing example interval measurements for one count in the first bin, under an embodiment. FIG. 8 shows a data acquisition cycle (DAC) comprising two DAGs of 512 subgates each, so that $L_C=2L_G$. This mode measures neutron pair intervals for a naturally radioactive source using an internal periodic trigger. As shown in FIG. 8, intervals between any two counts are denoted $\delta_{(i,j)}$ where i is the first bin containing a count, and j is the next bin containing a count. In an embodiment, all intervals are measured from the very first bin that contains a count, and is referred to as Type-II analysis in that only one neutron (in the lowest-numbered occupied bin the dual DAG) is considered the virtual trigger neutron. Thus for the example of FIG. 8, there are seven different bins containing detected neutrons (denoted by an *). Two bins, b-17 and b-518 contain two neutrons. This yields eight intervals all measured from the first bin that has a neutron, b-2.

FIG. 9 shows an example of a count using mode 1.B counting, according to the exemplary embodiment of FIG. 8. For the example of FIG. 9, the bin and subgate tally for mode 1.B is shown for bins 1 to 1024, and show the interval lengths, as a function of $\tau_0$ between bins that contain neutrons. The resulting count data lists the number of neutrons in each time interval based on $\tau_0$, that is 0-$\tau_0$, 1-$\tau_0$, 2-$\tau_0$, ... 1024-$\tau_0$, for a 1024 bin DAC. Each element in a similar cumulative data matrix is incremented after each DAC for the duration of the measurement.

Figure 10:
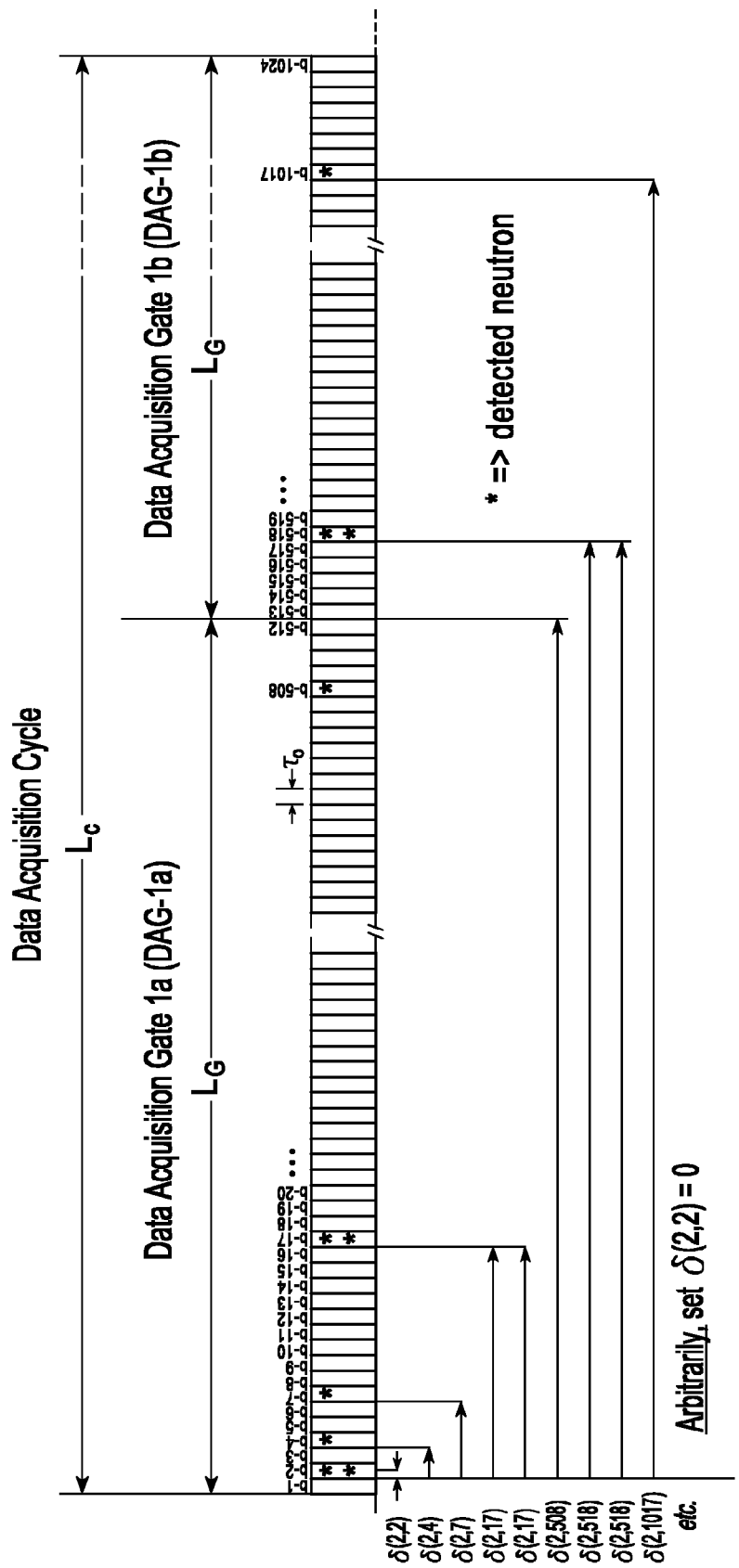
FIG. 10 illustrates a data acquisition cycle for count performed using mode 1.B and showing example interval measurements for two counts in the first bin, under an embodiment.

FIG. 10 illustrates a data acquisition cycle for count performed using mode 1.B and showing example interval measurements for two counts in the first bin, under an embodiment. FIG. 10 shows a data acquisition cycle (DAC) comprising two DAGs of 512 subgates each, so that $L_C=2L_G$. This mode measures neutron pair intervals for a naturally radioactive source using an internal periodic trigger. As shown in FIG. 10, intervals between any two counts are denoted $\delta_{(i,j)}$ where i is the first bin containing a count, and j is the next bin containing a count. Thus for the example of FIG. 10, there are seven different bins containing detected neutrons (denoted by an *). Three bins, b-2, b-17 and b-518 contain two neutrons. When the first bin that contains any counts contains two counts (e.g., b-2), then this first bin is set to 0, and the intervals are all measured from this bin (Type II). For the example of FIG. 10, this yields ten intervals all measured from the first bin that has two counts, b-2.

Figure 11:
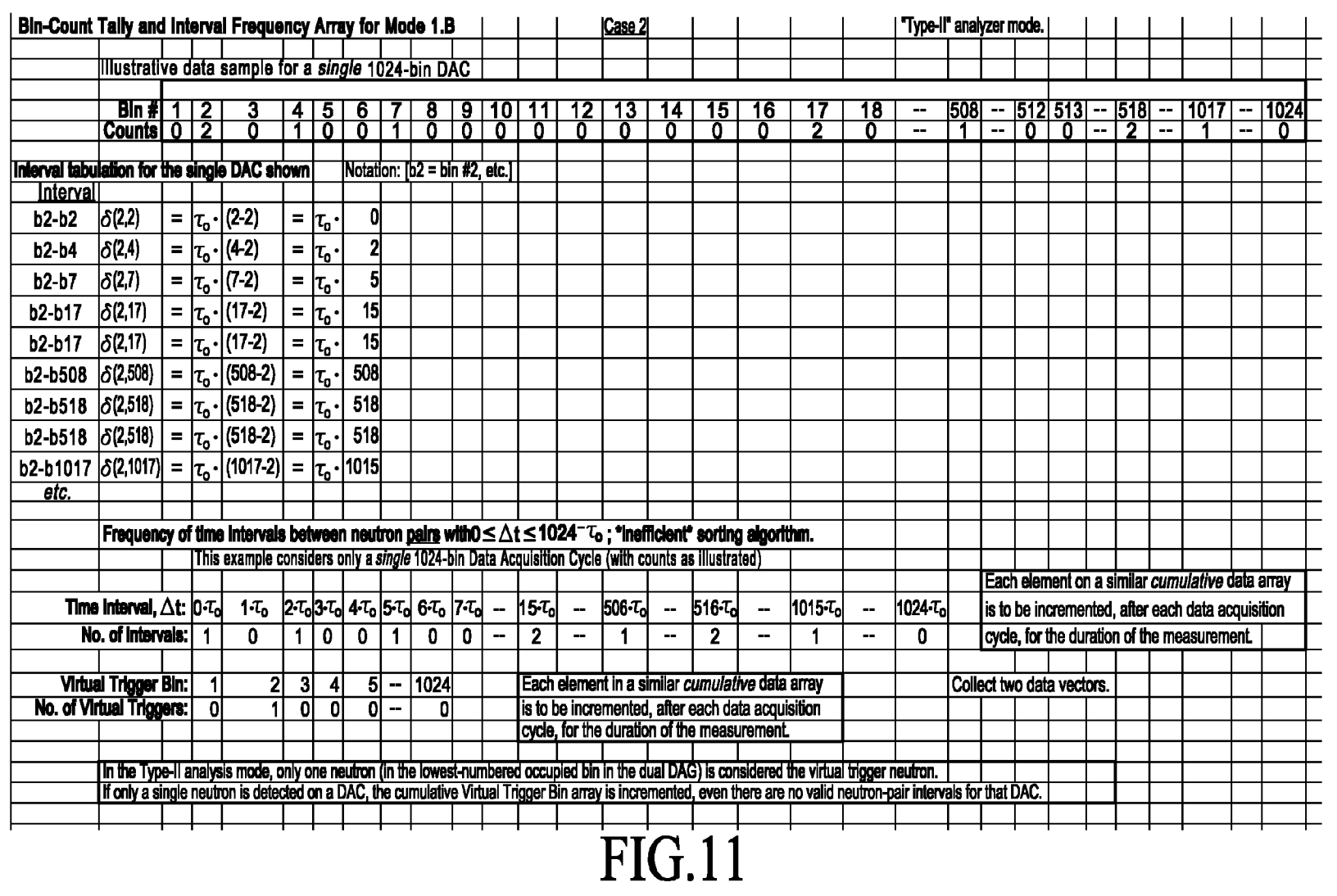

FIG. 11 shows an example of a count using mode 1.B counting, according to the exemplary embodiment of FIG. 10. For the example of FIG. 11, the bin and subgate tally for mode 1.B is shown for bins 1-1024, and show the interval lengths, as a function of $\tau_0$ between bins that contain neutrons. The resulting count data lists the number of neutrons in each time interval based on $\tau_0$, that is 0-$\tau_0$, 1-$\tau_0$, 2-$\tau_0$, ... 1024-$\tau_0$, for a 1024 bin DAC. Each element in a similar cumulative data matrix is incremented after each DAC for the duration of the measurement.

Figure 14:
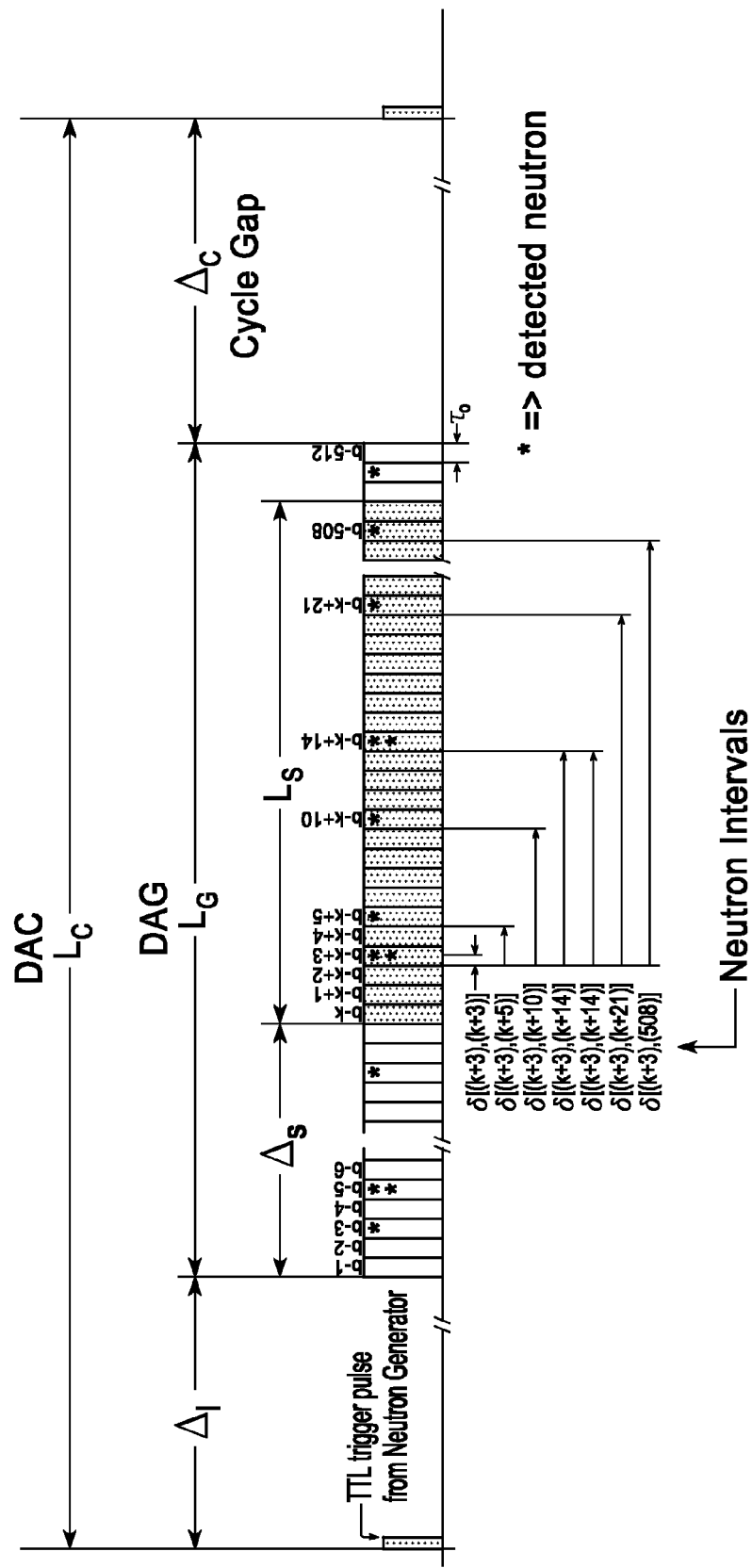
FIG. 14 illustrates a data acquisition cycle for count performed using mode 2.B and showing example interval measurements, under an embodiment.

FIG. 14 illustrates a data acquisition cycle for count performed using mode 2.B and showing example interval measurements, under an embodiment. FIG. 14 shows a data acquisition cycle (DAC) comprising a single DAG of 512 subgates. This mode measures neutron pair intervals for neutron induced activity using an external trigger, such as a pulsed neutron source. The DAC includes the DAG plus the initial gap $\Delta_I$ and the cycle gap, $\Delta_C$. As shown in FIG. 14, intervals between any two counts are denoted $\delta_{(k+i,k+j)}$ where i is the first bin containing a count, and j is the next bin containing a count, and k is the first bin following a subgate delay $\Delta_S$. In an embodiment, all intervals are measured from the very first bin after the subgate delay that contains a count (Type-II analysis). Thus for the example of FIG. 14, there are six different bins containing detected neutrons (denoted by an *). Two bins contain two neutrons. This yields seven intervals all measured from the first bin after the subgate delay that has a neutron, b–k+3.

Figure 15:
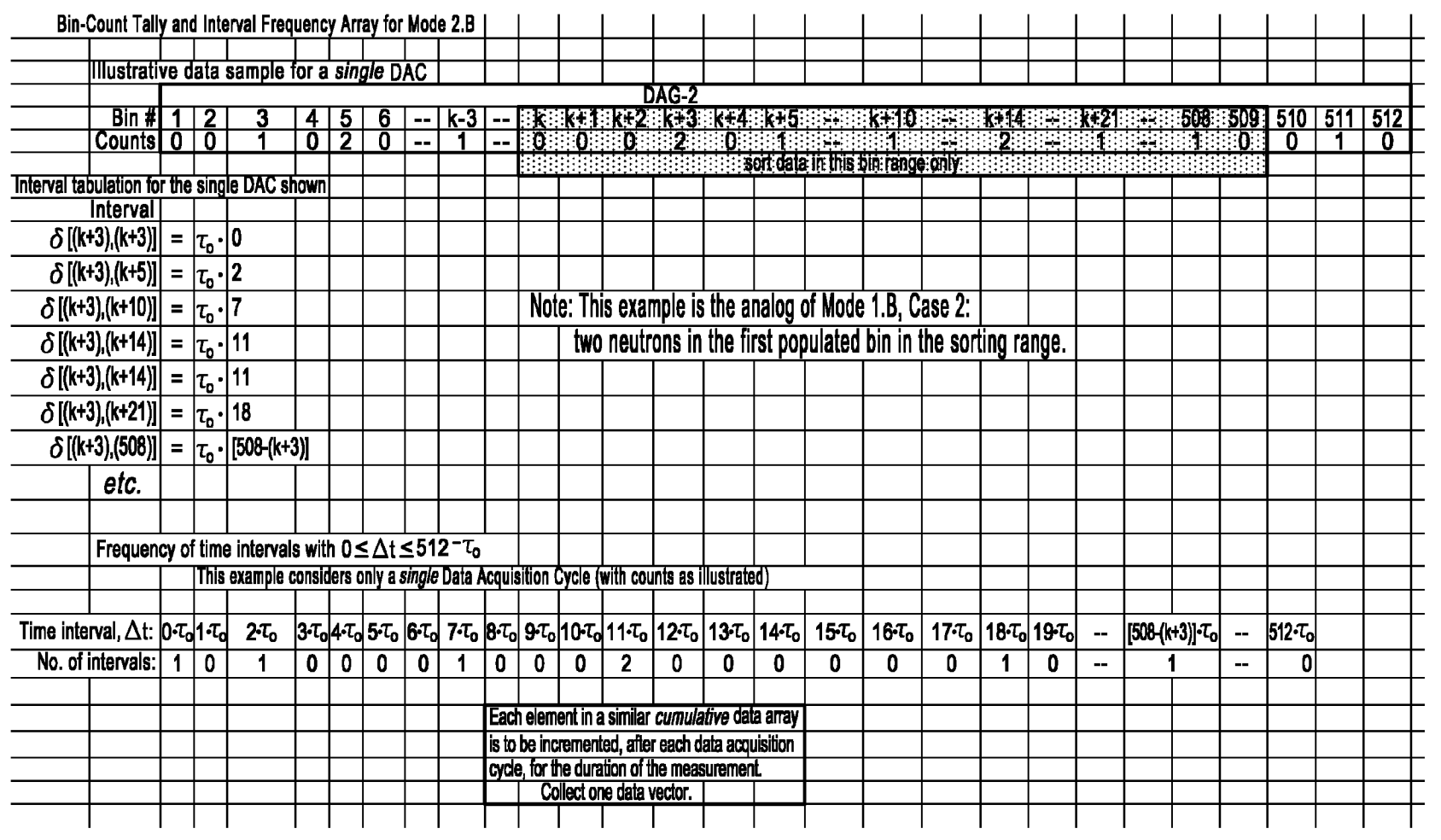

FIG. 15 shows an example of a count using mode 2.B counting, according to the exemplary embodiment of FIG. 14. For the example of FIG. 15, the bin and subgate tally for mode 2.B is shown for bins 1-512, and show the interval lengths, as a function of $\tau_0$ between bins that contain neutrons. The resulting count data lists the number of neutrons in each time interval based on $\tau_0$, that is, 0-$\tau_0$, 1-$\tau_0$, 2-$\tau_0$, ... 512-$\tau_0$, for a single DAC. Each element in a similar cumulative data matrix is incremented after each DAC for the duration of the measurement. The examples of FIGS. 14 and 15 illustrate a case in which there are two counts in the first populated bin in the sorting range.

For measurement class C, the measurement data is sorted according to the number of multiplets in each time bin within the data acquisition gate. This data allows the measurement of neutron die-away following the injection of the neutron pulse (e.g., 14-MeV) into the sample.

Figure 16:
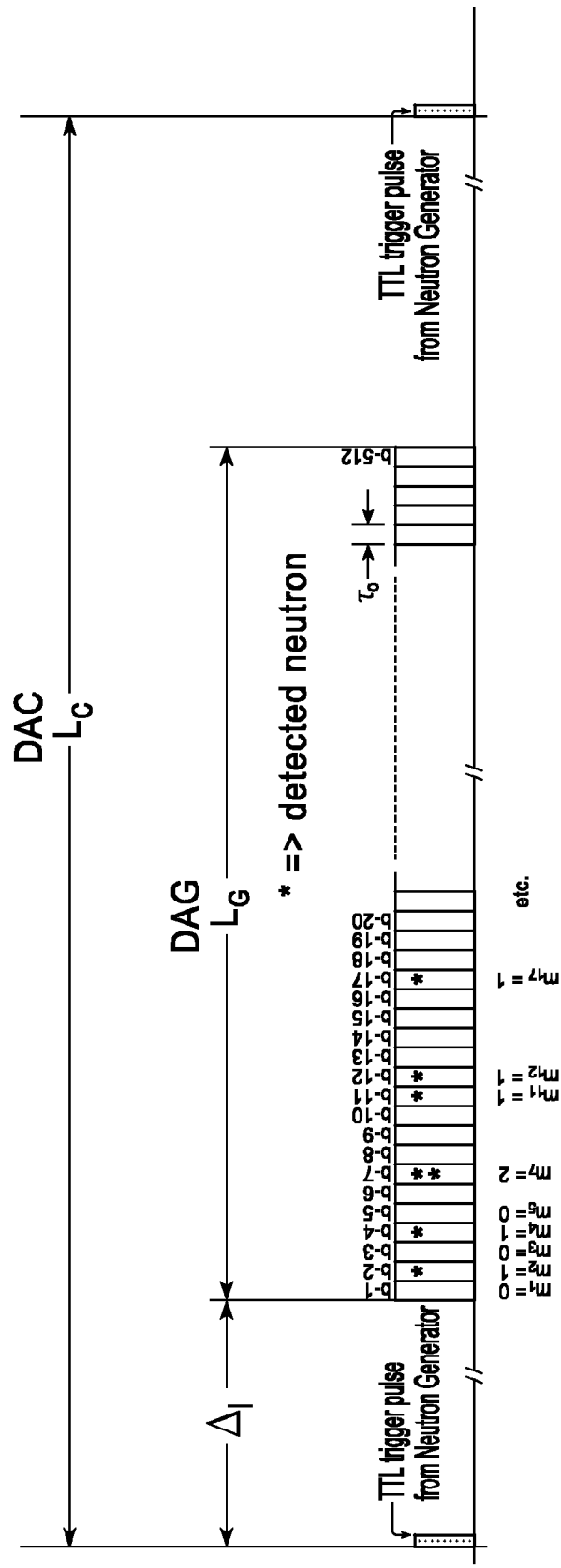
FIG. 16 illustrates a data acquisition cycle for count performed using mode 2.C and showing example multiplet count data, under an embodiment.

FIG. 16 illustrates a data acquisition cycle for count performed using mode 2.C and showing example multiplet count data, under an embodiment. FIG. 16 shows a data acquisition cycle (DAC) comprising 512 subgates. In mode 2.C the time measured from the start of the DAG for a multiplet in bin b-j is defined as $\tau_j=(j-1)\tau_o$, and the multiplicity for the bin is $m_j$. In mode 2.C, the DACs are initiated by an external trigger (e.g., a pulsed neutron generator). As shown in FIG. 16, an initial delay, $\Delta_i$, precedes the first DAG, and each subsequent DAG is preceded by a cycle gap, $\Delta_c$. The entire DAC is measured from the beginning of the delay preceding the DAG to the end of the delay preceding the next subsequent DAG.

Figure 17:
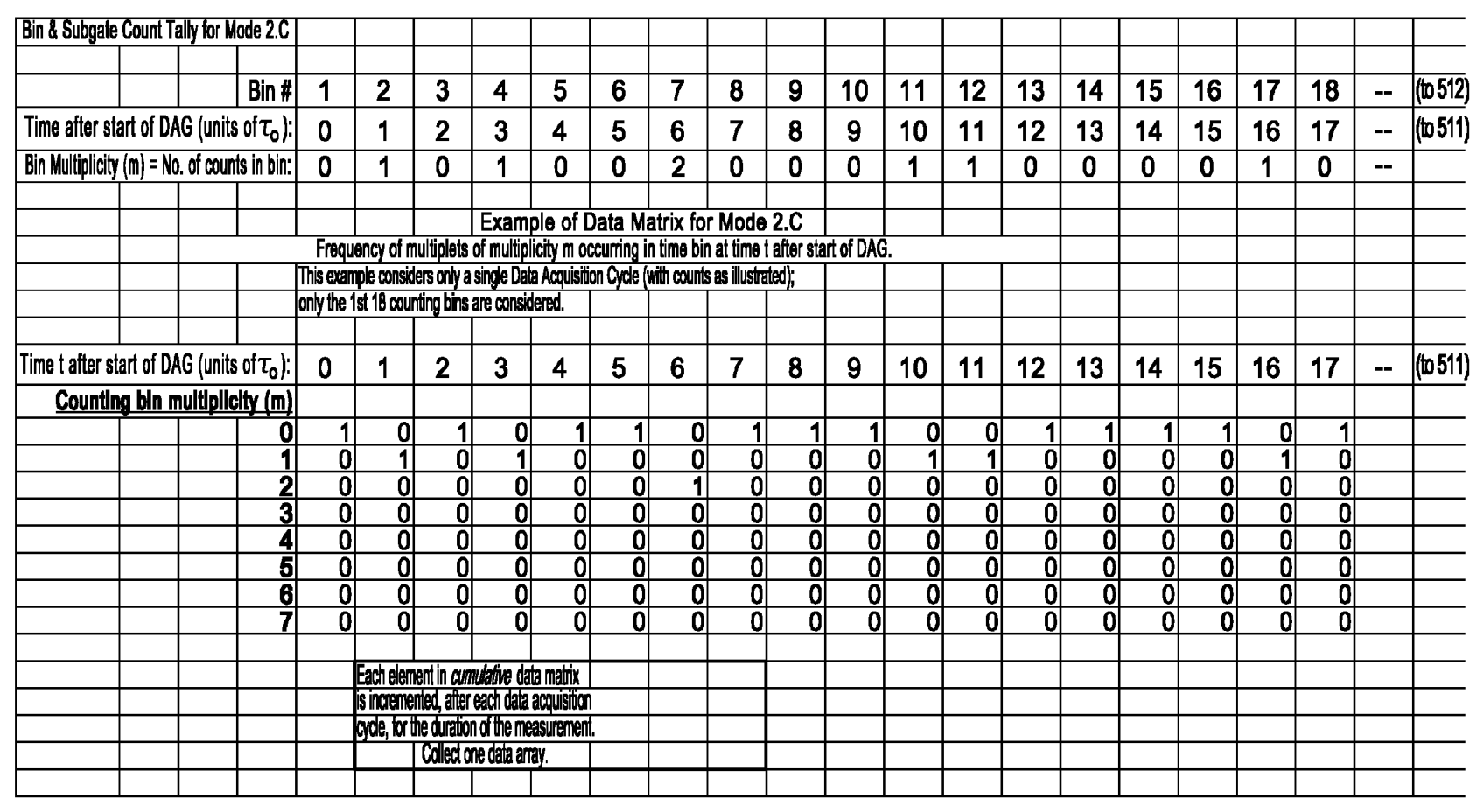

FIG. 17 shows an example of a multiplicity count using mode 2.C counting, according to the exemplary embodiment of FIG. 16. For the example of FIG. 17, the bin and subgate tally for mode 2.C is shown for bins 1-18 (of 512 total bins), and show the multiplicities, m, occurring within subgates of various widths for a particular DAC. The resulting matrix provides counts of multiplicity in an array specifying bins versus multiplicity count (e.g., 0 to 7). Each element in the cumulative data matrix is incremented after each DAC for the duration of the measurement.

In summary, four different data sorting algorithms must be implemented in order to carry out all of the classes of analysis that are necessary for both trigger modes 1 and 2 measurements, although only two are applicable in mode 1 and three are applicable in mode 2. It is desirable to implement simultaneous sorting of data by all four algorithms for all measurements, in order to simplify field operation of the detector system. During operation, a user must select the actual triggering mode (mode 1 or mode 2). Once the trigger mode is selected, the detector system will automatically perform all possible classes of measurement within that mode, thus if trigger mode 1 is selected, the detector will perform both the 1A and 1B measurements; and if trigger mode 2 is selected, the detector will perform the 2A, 2B, and 2C measurements.

As shown in FIG. 1, the overall detector system incorporating the multi-mode counter consists of a detector stage 106 and various electronic subsystems. The detector stage 106 comprises He-3 proportional-counter tubes embedded in a polyethylene moderator. The tubes may be in a single pod or in a pair of pods. The output pulses from the tubes are fed to an electronic module containing amplifiers and pulse-sorting circuitry. With respect to the five possible modes, the electronic subsystem 102 has four principal functions: first, it supplies the high-voltage to the He-3 tubes and power for the electronic counting circuitry from a self-contained battery pack; second, it permits user selection of a) one of the two triggering modes, internal (mode 1) or external (Mode II), b) a "Start Delay," $\Delta_1$, for mode 2 (set to the minimum value, 1-µs, for mode 1), c) the width, $\tau_o$, of the fundamental data-sorting time bins (minimum value currently restricted to 1 µs), and d) the number of Data Acquisition Cycles (DACs) for the measurement (typically $10^5$-$10^8$); third, it amplifies and shapes the analog output signals from each tube (e.g., through a separate amplifier and discriminator 104 for each tube) and feeds the signals to a data collection and sorting system; and fourth, it sorts the data collected on each DAC into the four data matrices required for the different modes and analysis types, and appropriately increments the cumulative data matrices at the end of each DAC, and outputs the cumulative data matrices at the end of each measurement.

The electronics module also displays and/or prints the average total counting rate in units of neutrons/DAG to allow the operator to adjust the length of the DAG and/or the sample-to-detector distance to achieve good data collection efficiency. It may also print a reminder to the operator that the number of neutrons/DAG needs to be large. (Since the number of counting bins will be fixed at 256, the length of the DAG is determined by the value of $\tau_o$ that is set).

The schematic representations of the neutron beam and the beam delay ($\Delta_o$) shown in FIG. 5 apply only to mode 2. When gathering data from mode 1, the 14-MeV neutron generator (i.e., external trigger input) is not used. The start pulse for the DAC is generated internally. The delay, $\Delta_2$, is essentially zero, and $\Delta_1$ is kept at the minimum value consistent with the triggering and data sorting requirements for the cycle (approximately 1 µs). The user-selected value, $\tau_o$, of the fundamental counting bin width, therefore, determines $L_G$ (the number of bins is fixed at 256), and (together with the fixed value of $\Delta_1$) the length of the DAC ($L_C$) and, of course, its inverse, the pulse repetition frequency (PRF).

In trigger mode 2, the user selects the values of $\tau_o$, $\Delta_1$, and the PRF of the neutron generator (within the operational limits of approximately 500-5000 Hz). The neutron generator control module provides a TTL output pulse that serves as the DAC start pulse. The neutron output from the generator occurs at a delay, $\Delta_o$, approximately 20-40 is after the start of the TTL pulse. The duration of the neutron beam pulse is determined by the selected PRF and the neutron generator duty factor, which is nominally fixed by the manufacturer at some value in the 5% to 10% range, but, in practice, is somewhat PRF dependent. FIGS. 5, 12, 14 and 16 show timing marks.

The number of time bins in the DAG will be fixed at 256. Each bin has the same width, $\tau_o$, which can be selected by the user to adjust the length of the DAG as required by the measurement to be made. The minimum value of $\tau_o$ is fixed at one µs by the current electronics in the system. The sum of neutron counts from all of the He-3 tubes in the detector is recorded in each time bin, as shown in FIGS. 4 and 5.

In an embodiment, $\Delta_1$ is kept to its minimum value and $\Delta_2$ is set to zero in mode 1, in order to maximize data acquisition efficiency. In mode 2, $L_G$, $\Delta_1$, and $L_C$ can all be set by the user. If these choices are not made judiciously [i.e., if $L_C<(L_G+\Delta_1)$], one could get a negative value of $\Delta_2$.

In mode 2, the measurement requirements may require the neutron beam to be positioned entirely prior to the start of the DAG, more or less coincident with the DAG, or overlapping part of the DAG. Variability of the PRF, $\Delta_1$, and $\tau_o$ allows such flexibility in beam position. Note that the beginning and end of the neutron beam is not well defined in time. Also, the term "beam" is used loosely, here; the 14-MeV neutrons are emitted isotropically by generator, and do not form a spatial beam in the usual sense of the word.

FIGS. 6 and 12 show examples of subgate detail. FIG. 14 illustrates another type of subgate counting. The level-1 subgates shown are equivalent to the fundamental time bins. In principle, each level-1 subgate could comprise two or more bins. If longer level-1 subgates are required, this can be achieved by increasing the size of $\tau_o$. It is possible, in principle, to implement a data sorting algorithm that contains more subgates of level-2 and higher. There are possible modifications of the current implementation (containing the same numbers of subgates of each level) in which some of the longer subgates could comprise different groupings of time bins than the ones indicated in the figure. On any given DAC, the neutron multiplicities in some of those subgates would generally differ from the multiplicities in the illustrated set of subgates. The total multiplicity count in all subgates of a given length would, over a measurement of many DACs, be statistically equivalent for all such variations of the implementation shown.

With reference to FIGS. 8, 10, 14 and 16, several constraints apply. For example, the average number of neutrons per DAG needs to be large. Any data acquisition cycles on which only zero or one neutron is detected provide no useful data for the Rossi-Alpha analysis. In order to collect data efficiently, it is necessary that an average of several (say≧10) neutrons be detected on each cycle. If two neutrons are counted in a single bin, the earlier of the two is considered to be the second member of a neutron pair with the nearest preceding neutron; the later neutron is the first member of a pair with the next succeeding neutron; and the two neutrons, themselves, constitute a pair separated by a time interval smaller than $\tau_o$. This time is arbitrarily defined to be a time interval of "zero" width. If three neutrons occur in a single bin, there are two intervals of zero width, and so on.

Embodiments described herein include a method for counting neutrons, comprising: collecting neutrons emitted from a source in a multi-detector array; inputting pulses from the multi-detector array in parallel to a plurality of separate inputs, wherein each input of the plurality of inputs is tied to a respective individual bit of a digital word; reading each digitized word at regular intervals to produce a plurality of read and digitized words, wherein all bits are read simultaneously to minimize latency; and storing each read and digitized word of the plurality of read and digitized words, wherein each read and digitized word is stored in a number of storage locations for subsequent processing. In this method, the multi-detector array may comprise a plurality of individual He-3 detector tubes. The digitized word may encode a count of neutrons emitted from the source.

In an embodiment, the count may be obtained by a count process comprising: collecting neutron data in parallel input circuits; controlling a minimum summing interval for counting the data; summing the data in said summing interval, to produce a data sum; storing the data sum in multiple arrays; and building data structures by constructing summed sections from each array of the multiple arrays. The input signals may be edge triggered, and the minimum summing interval may be controlled with a clock. In an embodiment, each input circuit is operatively connected to multiple independent means for adding of the parallel set. The data structures may comprise data selected from the group consisting of multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger. The data structures may also comprise multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

Embodiments are also directed to a method of neutron event counting, comprising: inputting edge triggered input signals into parallel input circuits observing each neutron event to be counted; controlling a minimum summing interval wherein data is counted, for use by a parallel set of means for adding, wherein each input circuit of said input circuits is operatively connected to multiple independent means for adding of said parallel set; reading a sum in each said means for adding during said minimum summing interval to produce a sum read; zeroing each said means for adding at the end of the minimum summing interval; storing said sum read into multiple arrays; and constructing summed sections from said array to build data structures comprising multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

Embodiments are further directed to a neutron detector system comprising: a multi-detector array collecting neutrons emitted from a source; an edge-detector having separate inputs, each receiving input pulses from the multi-detector array in parallel, wherein each input of the plurality of inputs is tied to a respective individual bit of a digital word; and a multi-mode counter module coupled to the edge-detector and comprising a plurality of simultaneously executing processing units, each processing unit utilizing a specific combination of trigger condition and count parameter for the input pulses. In this system, the trigger condition may be selected from one of an internal trigger and an external trigger. In an embodiment, the count parameter comprises the number of neutron multiplicities present in one or more time subgate periods during a data acquisition cycle of the detector. Alternatively, the count parameter comprises the distribution of neutron-pair time intervals during one or more data acquisition cycles of the detector. The data acquisition cycle may begin after a defined delay following the trigger condition. The system under an embodiment further comprises a word generator reading each digitized word at regular intervals to produce a plurality of read and digitized words, wherein all bits are read simultaneously to minimize latency. The system can further comprise a memory coupled to the word generator and storing each read and digitized word of the plurality of read and digitized words, wherein each read and digitized word is stored in a number of storage locations in the memory for subsequent processing.

Aspects of the circuitry and methodology may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the memory test process may be embodied in microprocessors having software-based circuit emulation, discrete logic (sequential and combinatorial), custom devices, fuzzy (neural) logic, quantum devices, and hybrids of any of the above device types.

The processor or processors mentioned or illustrated herein may be implemented as hardware circuitry embodied in one or more separate integrated circuit devices. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The foregoing description is provided for purposes of illustration and is not intended to be exhaustive or to limit the invention to the precise form disclosed. Many modifications and variations are possible in light of the above teaching. The embodiments disclosed explain the principles of the invention and its practical application to thereby enable others skilled in the art to best use the invention in various embodiments and with various modifications suited to the particular use contemplated. The scope of the invention is to be defined by the following claims.

What is claimed is:

1. A method for counting neutrons, comprising:
   collecting neutrons emitted from a source in a multi-detector array;
   inputting pulses from the multidetector array in parallel to a plurality of separate inputs to form input signals, wherein each input of the plurality of inputs is tied to a respective individual bit of a digitized word;
   reading each digitized word at regular intervals to produce a plurality of read and digitized words, wherein all bits are read simultaneously to minimize latency; and
   storing each read and digitized word of the plurality of read and digitized words, wherein each read and digitized word is stored in a number of storage locations for subsequent processing.

2. The method of claim 1 wherein the multi-detector array comprises a plurality of individual He-3 detector tubes.

3. The method of claim 1 wherein the digitized word encodes a count of neutrons emitted from the source.

4. The method of claim 3 wherein the count is obtained by a count process comprising:
   collecting neutron data in parallel input circuits;
   controlling a minimum summing interval for counting the data;
   summing the data in said summing interval, to produce a data sum;
   storing the data sum in multiple arrays; and
   building data structures by constructing summed sections from each array of the multiple arrays.

5. The method of claim 4, wherein the input signals are edge triggered.

6. The method of claim 5, wherein the minimum summing interval is controlled with a clock.

7. The method of claim 4, wherein each input circuit is operatively connected to multiple independent means for adding of the input signals.

8. The method of claim 4, wherein the data structures comprise data selected from the group consisting of multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

9. The method of claim 4, wherein said data structures comprise multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

10. A method of neutron event counting, comprising:
inputting edge triggered input signals into parallel input circuits observing each neutron event to be counted;
controlling a minimum summing interval wherein data is counted, for use by a parallel set of means for adding, wherein each input circuit of said input circuits is operatively connected to multiple independent means for adding of said parallel set;
reading a sum in each said means for adding during said minimum summing interval to produce a sum read;
zeroing each said means for adding at the end of the minimum summing interval;
storing said sum read into multiple arrays; and
constructing summed sections from the array to build data structures comprising multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

11. The method of claim 10 wherein the edge triggered input signals are generated by multi-detector array comprising a plurality of individual He-3 detector tubes.

12. The method of claim 10 wherein a digitized word encodes a count of neutrons emitted from a source being sampled.

13. A neutron detector system comprising:
a multi-detector array collecting neutrons emitted from a source;
an edge-detector having a plurality of inputs, each input receiving input pulses from the multi-detector array, wherein each input of the plurality of inputs is tied to a respective individual bit of a digital word; and
a multi-mode counter module coupled to the edge-detector and comprising a plurality of simultaneously executing processing units and a plurality of adder circuits, each processing unit utilizing a specific combination of trigger condition for the adder circuits and count parameter to define a minimum summing interval for counting the input pulses.

14. The system of claim 13 wherein the trigger condition is selected from one of an internal trigger and an external trigger.

15. The system of claim 14 wherein the count parameter comprises a number of neutron multiplicities present in one or more time subgate periods during a data acquisition cycle of the detector.

16. The system of claim 14 wherein the count parameter comprises a distribution of neutron-pair time intervals during one or more data acquisition cycles of the detector.

17. The system of claim 16 wherein the data acquisition cycle begins after a defined delay following the trigger condition.

18. The system of claim 13 further comprising a word generator reading digital words at regular intervals to produce a plurality of read words, wherein all bits are read simultaneously to minimize latency.

19. The system of claim 18 further comprising a memory coupled to the word generator and storing each read word of the plurality of read words, wherein each read word is stored in a number of storage locations in the memory for subsequent processing.

20. The system of claim 13 wherein the multi-detector array comprises a plurality of individual He-3 detector tubes.

* * * * *